(12) United States Patent
Yoshida et al.

(10) Patent No.: US 7,646,423 B2
(45) Date of Patent: Jan. 12, 2010

(54) IMAGE CAPTURE APPARATUS WITH ILLUMINATOR AND DISTANCE MEASURING LIGHT EMITTING DEVICE

(75) Inventors: Takashi Yoshida, Inagi (JP); Hiroyuki Tanaka, Inagi (JP); Yoshio Yoshizu, Inagi (JP); Kouichi Matsuo, Inagi (JP)

(73) Assignees: Fujitsu Limited, Kawasaki (JP); Fujitsu Frontech Limited, Inagi-shi (JP)

( * ) Notice: Subject to any disclaimer, the term of this patent is extended or adjusted under 35 U.S.C. 154(b) by 485 days.

(21) Appl. No.: 11/593,048

(22) Filed: Nov. 6, 2006

(65) Prior Publication Data

US 2007/0216797 A1 Sep. 20, 2007

(30) Foreign Application Priority Data

Mar. 3, 2006 (JP) ............................. 2006-058161

(51) Int. Cl.
H04N 5/222 (2006.01)
H04N 5/225 (2006.01)

(52) U.S. Cl. ....................................... 348/370; 348/374
(58) Field of Classification Search ................. 348/370, 348/374
See application file for complete search history.

(56) References Cited

U.S. PATENT DOCUMENTS

| 3,442,193 | A | * | 5/1969 | Pagel .......................... 396/110 |
| 6,154,279 | A | | 11/2000 | Thayer |
| 6,554,452 | B1 | * | 4/2003 | Bourn et al. ................ 362/247 |
| 6,688,523 | B1 | | 2/2004 | Koenck |
| 7,340,159 | B2 | * | 3/2008 | Sugiura et al. ................ 396/14 |
| 2006/0002592 | A1 | | 1/2006 | Muira et al. |
| 2006/0110145 | A1 | * | 5/2006 | Fujimoto et al. ............... 396/14 |
| 2008/0284902 | A1 | * | 11/2008 | Konno et al. ................. 348/370 |

FOREIGN PATENT DOCUMENTS

| EP | 1 610 265 A1 | 12/2005 |
| JP | 7-193735 A | 7/1995 |
| JP | 2000-78444 A | 3/2000 |
| WO | WO 2004-088588 A1 | 10/2004 |
| WO | WO-2004-088590 A1 * | 10/2004 |

OTHER PUBLICATIONS

European Search Report dated Mar. 6, 2007 issued in corresponding European Application No. EP 06 25 5594.

* cited by examiner

*Primary Examiner*—James M Hannett
(74) *Attorney, Agent, or Firm*—Westerman, Hattori, Daniels & Adrian, LLP

(57) ABSTRACT

An image capturing apparatus illuminates and captures an image of an object using reflected light therefrom, with simplified distance measurement. A plurality of light-emitting devices are mounted around an image sensor, and a light guide member guides the light of the light-emitting devices to an image capturing region for illumination. The image capturing apparatus having the closely disposed image capturing system and illumination system, further has a distance-measuring light-emitting device and an aperture on the distance-measuring light-emitting device and for generating an optical path having narrowed downside and broadened upside. Thus, diffused reflected light rays of distance-measuring light-emitting device can be selected, converged and output to one direction. It becomes possible to obtain sufficient irradiation amount even when using a power-saving light-emitting device of a small emission amount, and to miniaturize a distance sensor irradiating spot light, contributing to miniaturization of the image capturing apparatus.

13 Claims, 23 Drawing Sheets

FIG. 5
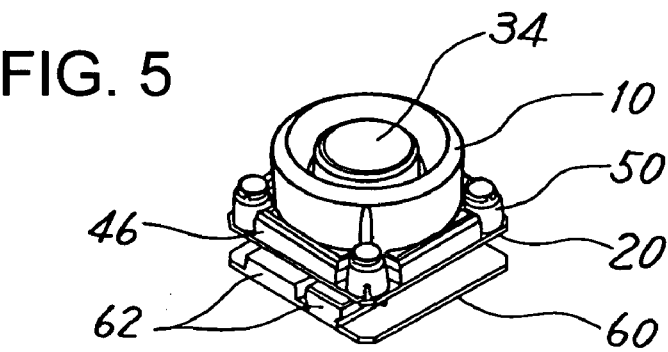
FIG. 6
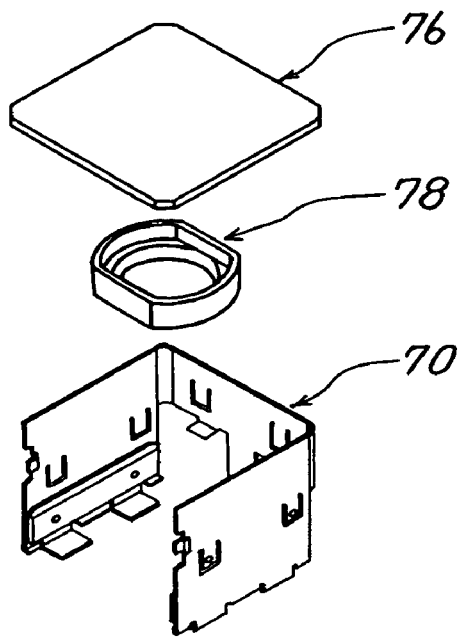
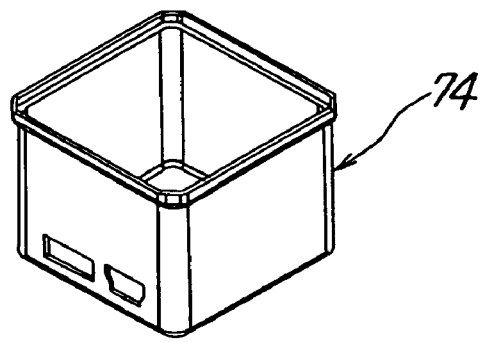

IMAGE CAPTURE APPARATUS WITH ILLUMINATOR AND DISTANCE MEASURING LIGHT EMITTING DEVICE

CROSS-REFERENCE TO RELATED APPLICATIONS

This application is based upon and claims the benefit of priority from the prior Japanese Patent Application No. 2006-058161, filed on Mar. 3, 2006, the entire contents of which are incorporated herein by reference.

BACKGROUND OF THE INVENTION

1. Field of the Invention

The present invention relates to an image capturing apparatus for guiding light emitted from a plurality of light-emitting devices to an object, irradiating the object, and image capturing the object, and more particularly an image capturing apparatus for image capturing an object by measuring the distance to the object.

2. Description of the Related Art

An image capturing apparatus for image capturing a predetermined range of an object by irradiating the object with uniform light is widely used. In an image processing system using an image captured by such the image capturing apparatus, a clear image is particularly required.

For example, with the development of biometric technologies in recent years, there have been provided a variety of apparatuses for personal identification, which captures features of a living body, a portion of a human body by which an individual can be distinguished, and recognizes the features of the living body, for example, fingerprints of limbs, eye retinas, face and blood vessels.

In particular, blood vessels and skin patterns of a palm and back of the hand and a finger are suitable for reliable personal authentication, because a relatively large amount of personal feature data may be obtained therefrom. Further, it is believed that the patterns of blood vessels (veins) do not change from the time of an embryo throughout the lifetime of any person, and that no identical pattern exists among any persons without exception, which are therefore suitable for personal authentication.

For such the biometric authentication or the like, it is necessary to capture an image of an object (a portion of a human body in case of the biometric authentication) in a non-contact manner. For this purpose, the image capturing apparatus emits light producing uniform light intensity in a certain image capturing range (distance and area), receives the reflected light of the above image capturing range by a sensor, and outputs an captured image signal as an electric signal. Further, to perform image capturing appropriately, it is necessary to provide a distance sensor to measure the distance to the object.

FIGS. 34 and 35 show explanation diagrams of the conventional image capturing apparatus. As shown in FIGS. 34 and 35, an image capturing apparatus 100 includes an image capturing (digital camera) unit 120 at the center, and in the periphery thereof, a plurality of light-emitting devices 130-1 to 130-8 and a non-illustrated optical distance sensor. The dotted lines shown in FIG. 34 represent the range of the light having uniform intensity emitted from an individual light-emitting device among the plurality of light-emitting devices 130-1 to 130-8.

As such, by disposing a plurality of (here, eight) point light sources in the periphery of image capturing unit 120, the image capturing range of the image capturing unit 120 can be irradiated with the light of uniform intensity. Meanwhile, as shown in FIG. 35, the image capturing unit 120 includes a photoelectric conversion unit 122 such as a CMOS sensor, and an optical system 124 such as a lens. Since the photoelectric conversion device, which is a plane photodetector device, has a predetermined light receiving area, a predetermined optical distance is required to guide the reflected light of the image capturing range onto the light-receiving plane of the photoelectric conversion device 122. For this purpose, a lens 124 such as a fisheye lens is disposed between the photoelectric conversion unit 122 and the object, so that an image of the predetermined image capturing range is projected onto the light-receiving plane of photoelectric conversion device 122.

Thus, conventionally, in order to irradiate the object with each point light source element 130-1 to 130-8 by sharing a predetermined image capturing range, the point light source elements 130-1 to 130-8 have been disposed apart from each other, as shown in FIG. 34. Also, in order to supply the light of predetermined uniform intensity to the image capturing range, the point light source elements 130-1 to 130-8 have been disposed nearer to the object than the photoelectric conversion device 122, as shown in FIG. 35. Further, the distance sensor measures the distance to the object by irradiating the object with spot light and receiving the reflected light thereof. For this purpose, similarly, the distance sensor has been disposed near the object (For example, the International Patent Publication No. WO 2004/088588 (FIGS. 1 and 6)).

In the above conventional image capturing apparatus, as described earlier, the point light source elements 130-1 to 130-8 are disposed apart from each other, and nearer to the object than the photoelectric conversion device 122, as shown in FIG. 35. Therefore, it is difficult to miniaturize the image capturing apparatus. Also, there is a restriction when incorporating the image capturing apparatus into equipment.

Also, some light-emitting devices generate high light intensity. Using such a light-emitting device, it may become to dispose the light-emitting device close to the image capturing unit 120. However, the light-emitting device generating high light intensity is expensive, and has large power consumption, which is therefore not suitable for a small-sized low-cost image capturing apparatus.

Similarly, as to the distance sensor, because of disposition close to the object, miniaturization of the image capturing apparatus is difficult, and there is a restriction when incorporating the image capturing apparatus into equipment.

SUMMARY OF THE INVENTION

Accordingly, it is an object of the present invention to provide an image capturing apparatus for performing spread illumination on an object, capturing an image of the object and measuring a distance to the object even when being miniaturized.

It is another object of the present invention to provide an image capturing apparatus for performing spread illumination on an object, capturing an image of the object, and measuring the distance using a power-saving distance sensor even when being miniaturized.

It is still another object of the present invention to provide a miniaturized image capturing apparatus performing spread illumination on an object, capturing an image of the object, and improving mounting accuracy of a distance sensor.

In order to achieve the aforementioned objects, according to the present invention, an image capturing apparatus for capturing an image of an object by illuminating the object and receiving reflected light from the object includes: an image sensor for receiving the reflected light; a plurality of light-emitting devices mounted in the peripheral positions of the image sensor; a light guide member for guiding the light of the plurality of light-emitting devices to an image capturing range, and illuminating the image capturing range; an optical unit accommodated inside the light guide member and for guiding the reflected light of the object in the illuminated image capturing range to the image sensor; distance-measuring light-emitting devices for irradiating the object with light; apertures disposed on the distance-measuring light-emitting devices, and for covering light rays of the distance-measuring light-emitting devices, converging and guiding the light rays to a focusing lens; and a control circuit for driving the distance-measuring light-emitting device, detecting spot light positions of the distance-measuring light-emitting devices from a photographed image of the image sensor, and obtaining the distance to the object.

Further, according to the present invention, preferably, the aperture includes a holder for covering the light rays of the distance-measuring light-emitting device, a focusing lens for outputting spot light, and a condenser for converging the light rays of the distance-measuring light-emitting device to the direction of the focusing lens.

Further, according to the present invention, preferably, the aperture is constituted of a material for forming an optical path of an upside-down trapezoidal shape to the direction of the focusing lens.

Further, according to the present invention, preferably, the plurality of light-emitting devices are mounted on a circuit board at predetermined intervals along a circle in the periphery of the image sensor, and the light guide member is ring-shaped corresponding to the circle.

Further, according to the present invention, preferably, the image sensor and the plurality of light-emitting devices and the distance-measuring light-emitting devices are mounted on an identical circuit board.

Further, according to the present invention, preferably, the image capturing apparatus includes a diffusion and polarization plated is posed between the light guide member and the plurality of light-emitting devices, diffusing and polarizing the light of the light-emitting devices, and a mount table for mounting the diffusion and polarization plate.

Further, according to the present invention, preferably, the image capturing apparatus includes a diffusion and polarization plate disposed between the light guide member and the plurality of light-emitting devices, and for diffusing and polarizing the light of the light-emitting devices, and a mount table integrally formed with the aperture, and for mounting the diffusion and polarization plate.

Further, according to the present invention, preferably, the distance-measuring light-emitting devices are mounted for a plurality of numbers on the circuit board so as to measure the distance to the object in the image capturing range, using the image of the image sensor.

Further, according to the present invention, preferably, the distance-measuring light-emitting devices are mounted on the circuit board in outer positions of the light-emitting devices.

Further, according to the present invention, preferably, the plurality of light-emitting devices are constituted of light-emitting devices for emitting infrared light, and an optical filter is further provided for filtering visible light.

Further, according to the present invention, preferably, the light guide member includes a lower end portion for introducing the light of the light-emitting devices, an upper end portion for outputting the light to the image capturing range, and a light guide portion for guiding the light of the light-emitting devices from the lower end portion to the upper end portion.

Further, according to the present invention, preferably, the distance-measuring light-emitting devices are constituted of four light-emitting devices, and mounted on the circuit board in outer positions of the light-emitting devices so as to form a diagonal relationship.

Further, according to the present invention, preferably, the aperture is constituted of four aperture units corresponding to the four light-emitting devices.

Further, according to the present invention, preferably, the image sensor images a portion of a living body.

According to the present invention, a miniaturized image capturing apparatus having an image capturing system disposed close to an illumination system can be realized by mounting a plurality of light-emitting devices in the periphery of an image sensor, and guiding the light of the plurality of light-emitting devices to an image capturing region by a light guide member for illumination. With the provision of an aperture on the distance-measuring light-emitting device for generating an optical path having a narrowed downside portion and a broadened upside portion, random reflected light rays of the light-emitting device can be selected, converged and output to one direction. Thus, it becomes possible to obtain a sufficient irradiation amount even when using a power-saving light-emitting device of a small emission amount, and to miniaturize a distance sensor for irradiating spot light, thereby contributing to the miniaturization of the image capturing apparatus.

Further scopes and features of the present invention will become more apparent by the following description of the embodiments with the accompanied drawings.

BRIEF DESCRIPTION OF THE DRAWINGS

FIG. 5 shows an assembly diagram of the components shown in FIG. 2.

FIG. 6 shows a configuration diagram of the external finishing components shown in FIG. 1.

DETAILED DESCRIPTION OF THE PREFERRED EMBODIMENTS

The preferred embodiment of the present invention is described hereinafter referring to the charts and drawings, in the order of image capturing apparatus configuration, illumination mechanism, hood structure, distance sensor, image processing configuration, configuration of another image capturing apparatus, and other embodiments. However, it is to be noted that the scope of the present invention is not limited to the embodiments described below.

Image Capturing Apparatus

Figure 1:
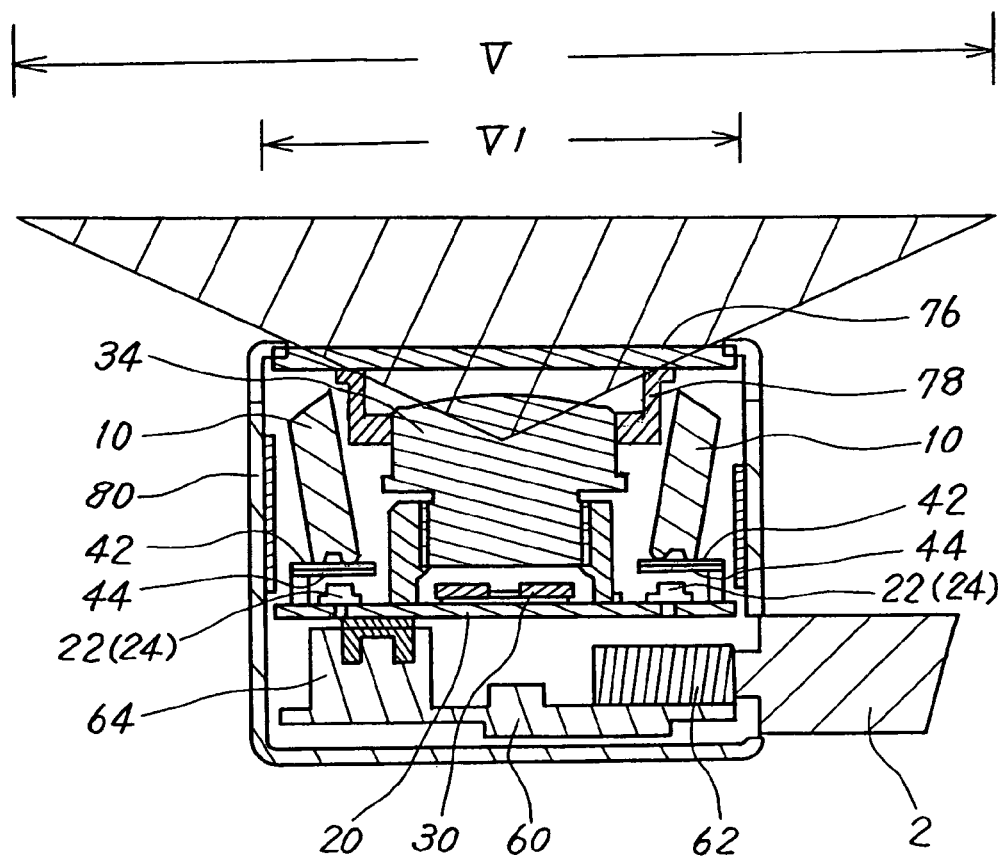
FIG. 1 shows a cross-sectional view of an image capturing apparatus according to one embodiment of the present invention.
Figure 2:
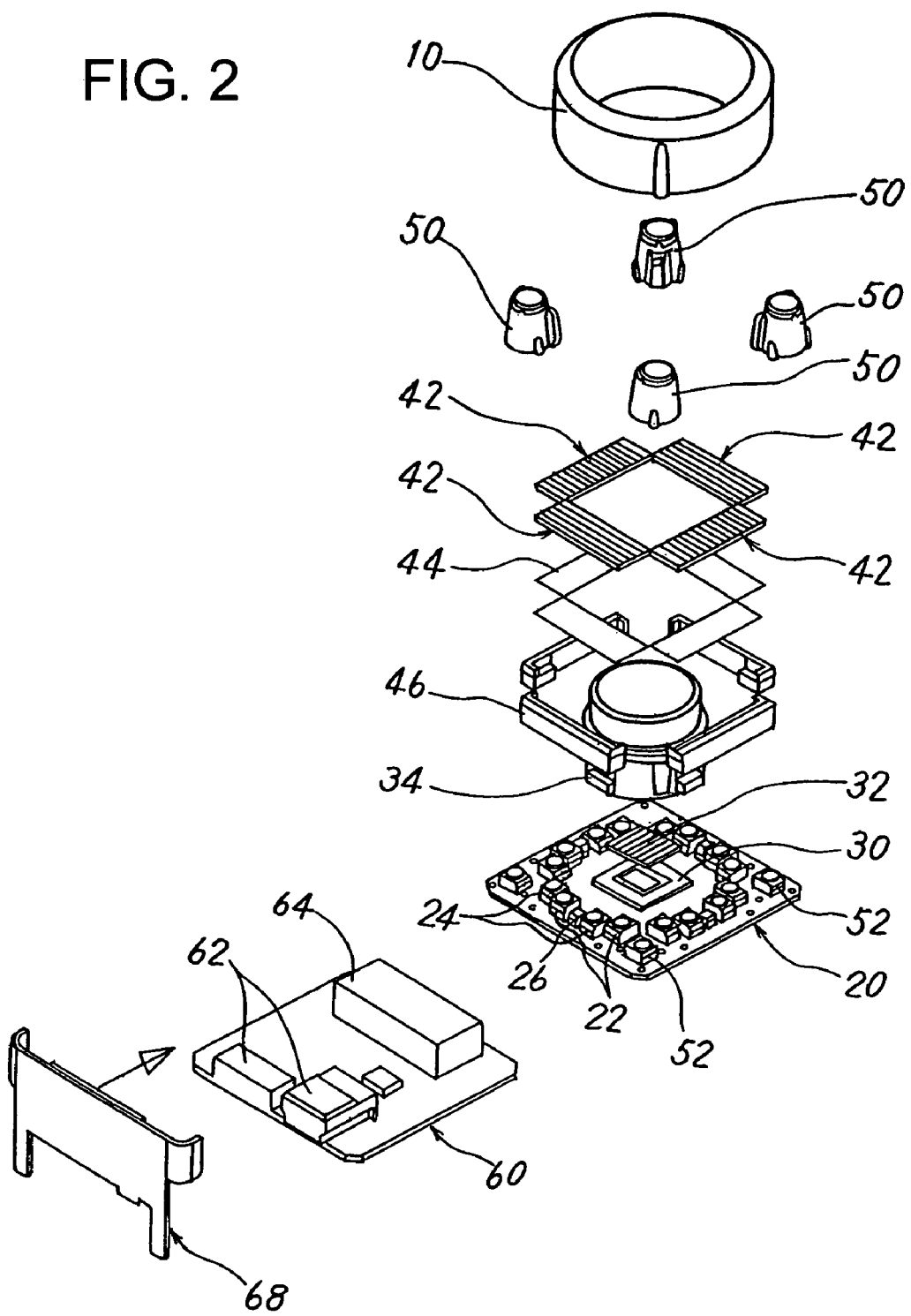
FIG. 2 shows an exploded structural view of the image capturing apparatus shown in FIG. 1.
Figure 3:
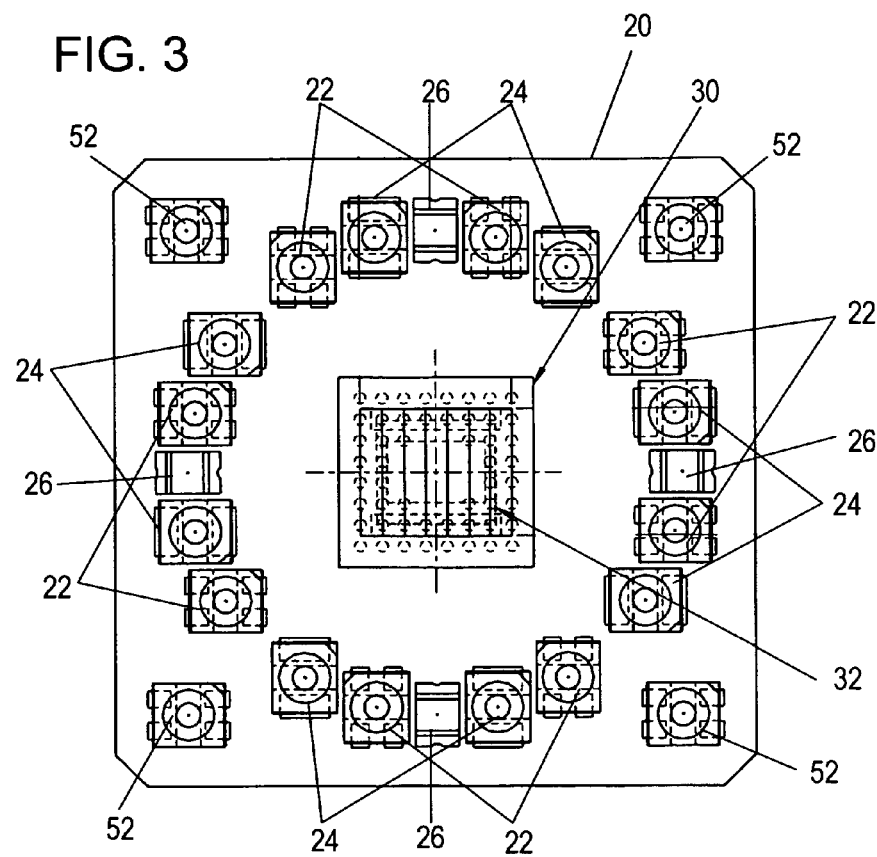
FIG. 3 shows a component layout diagram of the circuit board shown in FIG. 2.
Figure 4:
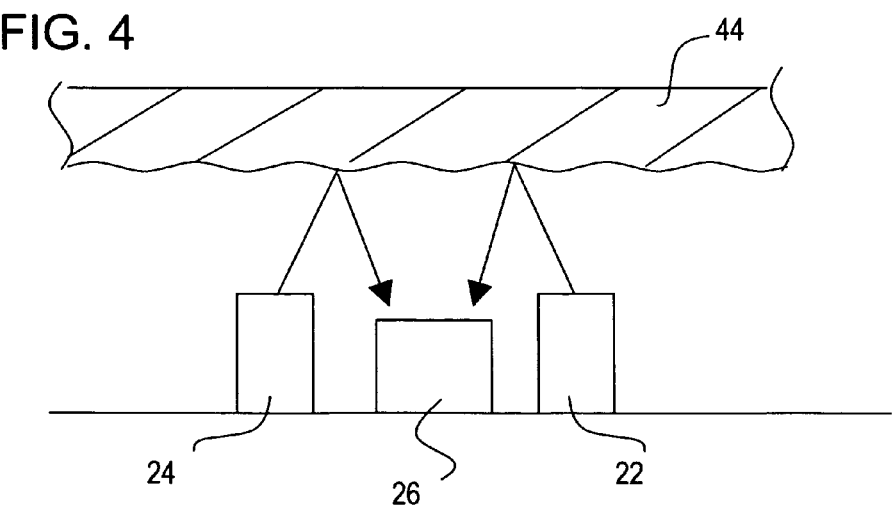
FIG. 4 shows an explanation diagram of the relationship between light-emitting devices and a photodetector device shown in FIG. 2.
Figure 7:
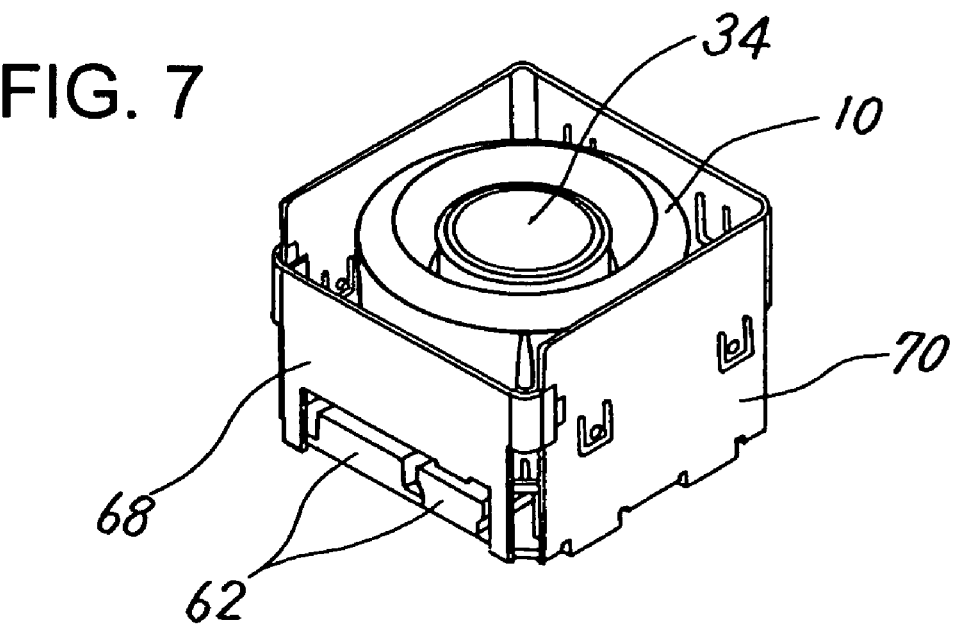
FIG. 7 shows a configuration diagram of the assembly of the assembled body shown in FIG. 2.
Figure 8:
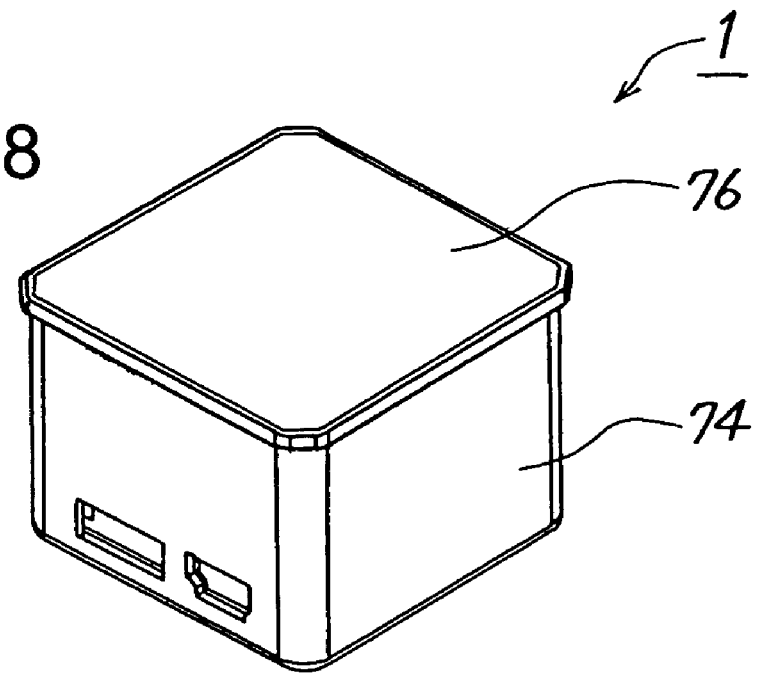
FIG. 8 shows an outer view of the image capturing apparatus shown in FIG. 1.

FIG. 1 shows a cross-sectional view of an image capturing apparatus according to one embodiment of the present invention; FIG. 2 shows an exploded structural view of the image capturing apparatus shown in FIG. 1; FIG. 3 shows a top plan view of the circuit board shown in FIGS. 1, 2; FIG. 4 shows an operation explanation diagram of a light-emitting device and a photodetector device shown in FIG. 3; FIG. 5 shows an assembly diagram when the structures shown in FIG. 2 are assembled; FIG. 6 shows a configuration diagram of the external case shown in FIG. 1; FIG. 7 shows a configuration diagram when the assembled body shown in FIG. 2 is housed in the external case; and FIG. 8 shows an outer view of the image capturing apparatus shown in FIG. 1.

Prior to the description of the configuration shown in FIG. 1, referring to FIGS. 2 through 7, the configuration of each portion illustrated in FIG. 1 is described. As shown in FIG. 2, an image sensor 30 such as a CMOS image sensor and a polarizing plate 32 are disposed at the center of a camera substrate 20. In the periphery of the image sensor 30 of the camera substrate 20, a plurality of light-emitting devices 22, 24 and photodetector devices 26 are mounted.

Describing in more detail with reference to FIG. 3, the image sensor 30 is mounted at the center of the camera substrate 20, and the polarizing plate 32 is laminated on the image sensor 30. Along the circle in the periphery of the image sensor 30 of the camera substrate 20, a plurality of light-emitting devices 22, 24 and the photo-detector devices 26 are mounted. Namely, in the periphery of the image sensor 30, eight (8) first light-emitting devices (LED) 22 and eight (8) second light-emitting devices (LED) 24 are disposed, respectively.

Between each the above first light-emitting device 22 and each the second light-emitting device 24, the photo-detector device (photodiode) 26 is disposed. As shown in FIG. 4, the above photodetector device 26 is provided for receiving the light from both the first light-emitting device 22 and the light from the second light-emitting device 24 (that is, reflected light from a diffusion plate 44 described later), thereby performing APC (automatic power control) of the first light-emitting device 22 and the second light-emitting device 24. The above first light-emitting device 22 and the second light-emitting device 24 are driven for emission at individual timing.

In the above example, in order to independently perform automatic power control of each the first and second light-emitting device 22, 24, which emits light at individual timing, one photodetector device 26 is disposed between the first light-emitting device 22 and the second light-emitting device 24 so as to receive the light from the first and second light-emitting devices 22, 24. Thus, the number of photodetector devices for APC control can be reduced.

Further, at the four corners of the camera substrate 20, four distance-measuring light-emitting devices 52 are provided for measuring the distance to the object. As shown in FIG. 3, the above four distance-measuring light-emitting devices 52 are disposed on the diagonal lines of the camera substrate 20, at the farthest positions on the diagonal lines so that each distance therebetween becomes farthest. From the distances measured by the above four distance-measuring light-emitting devices 52, the inclination of the object (here, palm) is detected.

In brief, on a single camera substrate 20, there are provided illumination system 22, 24, 26 and image capturing system 30, 32 for image capturing the object, as well as a distance-measuring system 52.

Now, referring back to FIG. 2, in the upper direction of the light-emitting devices 22, 24 of the camera substrate 20, there are provided four diffusion plates 44 and four polarizing plates 42. The above diffusion plates 44 and polarizing plates 42 are respectively stuck onto the diffusion/polarization plate mount tables 46 being attached on the four sides of the camera substrate 20. Each diffusion plate 44 diffuses, to a certain extent, the emission distribution of the directive light emitted from the first and second light-emitting devices 22, 24. Each polarizing plate 42 converts natural light emitted from the first and second light-emitting devices 22, 24 to linearly polarized light.

In the upper direction of the four polarizing plates 42, a ring-shaped light guide member 10 is provided. The light guide member 10 is formed of, for example, resin, and guides the light from the first and second light-emitting devices 22, 24 of the camera substrate 20 in the upward direction, so as to irradiate the object with uniform light. To fit the arrangement of the light-emitting devices 22, 24 of the camera substrate 20, the light guide member 10 has a ring-shaped structure. As will be described in FIG. 9 and after, the light guide member 10 guides the light emitted from the first and second light-emitting devices 22, 24 to the upward direction, so that the object is irradiated with uniform light.

Further, an optical unit 34 is attached to the camera substrate 20 on the image sensor 30 disposed in the approximate center of the camera substrate 20, and inside the ring-shaped light guide member 10. The optical unit 34 is constituted of a lens optical system such as a converging lens.

An aperture 50 is mounted on the distance-measuring light-emitting device 52 of the camera substrate 20. As will be described later, the aperture 50 shuts off diffusion of light to other directions so as to guide the light emitted from the distance-measuring light-emitting devices 52 to the object direction.

Separately from the camera substrate 20, a control substrate 60 is provided. The control substrate 60 is provided for connecting with the outside, and includes an external connector 62 and a camera connector 64 for connecting with the camera substrate 20. The above control substrate 60 is disposed on the lower portion of the camera substrate 20, and electrically connected with the camera substrate 20 using the camera connector 64. Further, a holder cover 68 is provided for the external connector 62.

In such a way, the image sensor 30, light-emitting devices 22, 24, photodetector devices 26 and distance-measuring light-emitting devices 52 are mounted on the camera substrate 20. Also, the diffusion/polarization plate mount tables 46, diffusion plates 44, polarizing plates 42, apertures 50, optical unit 34, and light guide members 10 are mounted on the above camera substrate 20, and thus a camera portion is assembled. To the above camera portion, the control substrate 60 is attached. FIG. 5 shows a state of the unit after the camera portion and the control substrate are attached.

Further, as shown in FIG. 6, there are prepared a visible-light cutoff filter plate 76, a hood 78, a holder assembly 70 and an external case 74. By attaching attachment unit shown in FIG. 5 to the holder assembly 70 shown in FIG. 6, and also, by attaching the holder cover 68 shown in FIG. 2 to the holder assembly 70, the configuration shown in FIG. 7 is assembled.

The configuration shown in FIG. 7 is then housed into the external case 74 shown in FIG. 6, and by attaching the visible-light cutoff filter plate 76 having an attached hood 78 on the upper portion of the external case 74, an image capturing apparatus shown in FIG. 8 is structured. The above visible-light cutoff filter plate 76 cuts off the visible light component so as not to enter the image sensor 30 from outside. Further, as described below referring to FIG. 1, the hood 78 shuts off the light so that the light outside the predetermined image capturing area does not enter the optical unit 34, and prevents the light being leaked from the light guide member 10 from invading into the optical unit 34.

FIG. 1 shows a cross-sectional view of the finished body 1 shown in FIG. 8. As described earlier, the image sensor 30, light-emitting devices 22, 24, photodetector devices 26 and distance-measuring light-emitting device 52 are mounted on the camera substrate 20. Namely, a basic structure including the illumination system and the image capturing system is mounted on the single substrate. Accordingly, only one mounting board is sufficient, thus contributing to cost reduction.

Also, with the provision of the ring-shaped light guide member 10 on the upper portion of the light-emitting devices 22, 24, the light from the light-emitting devices 22, 24 is guided to the visible-light cutoff filter 76. The above light guide member 10 separates the light from the light-emitting devices 22, 24 and then forwards the light to the visible-light cutoff filter 76. Therefore, the light-emitting devices 22, 24 can be disposed close to the image sensor 30, and also on the identical substrate 20, which enables miniaturization, and illumination of the object by uniform light as well. More specifically, assuming that an oblique line portion of an upside-down triangle shape shown in FIG. 1 is the image capturing range of the camera, the image capturing range can be illuminated by uniform light.

Further, because the light guide member 10 has a ring shape, it is possible to house the optical unit 34 inside the ring 10, thus enabling further miniaturization. In addition, the hood 78 prevents the light outside the predetermined image capturing range (oblique line portion in FIG. 1) from entering the optical unit 34, and also prevents the light leaked from the light guide member 10 from invading into the optical unit 34. Accordingly, even when the light guide member 10 and light-emitting devices 22, 24 are disposed close to the image sensor 30 and optical unit 34, degradation in image capturing accuracy can be avoided.

Moreover, since the distance-measuring light-emitting devices 52 are provided on the camera substrate 20, it becomes possible to further miniaturize the camera unit measuring the distance. Additionally, in FIG. 1, the control substrate 60 is connected to the lower portion of the camera substrate 20, and an external cable 2 is connected to the external connector 62 of the control substrate 60.

Illumination Mechanism

Figure 9:
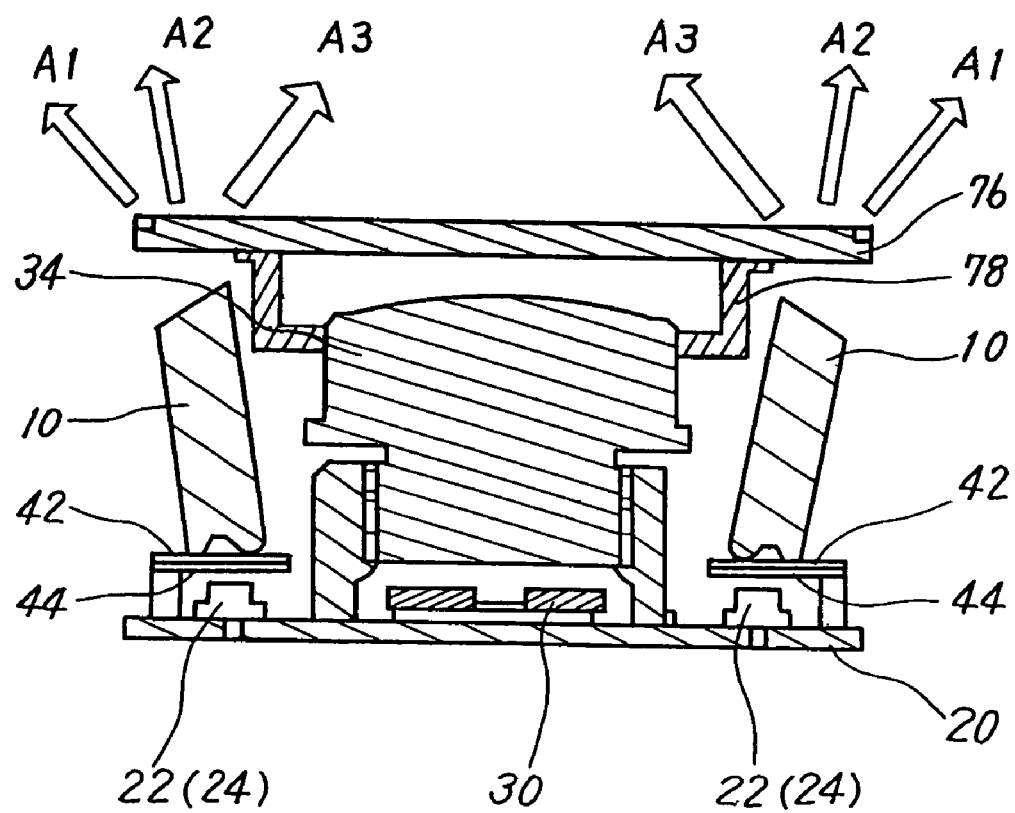
FIG. 9 shows an explanation diagram of the illumination system shown in FIG. 1.
Figure 10:
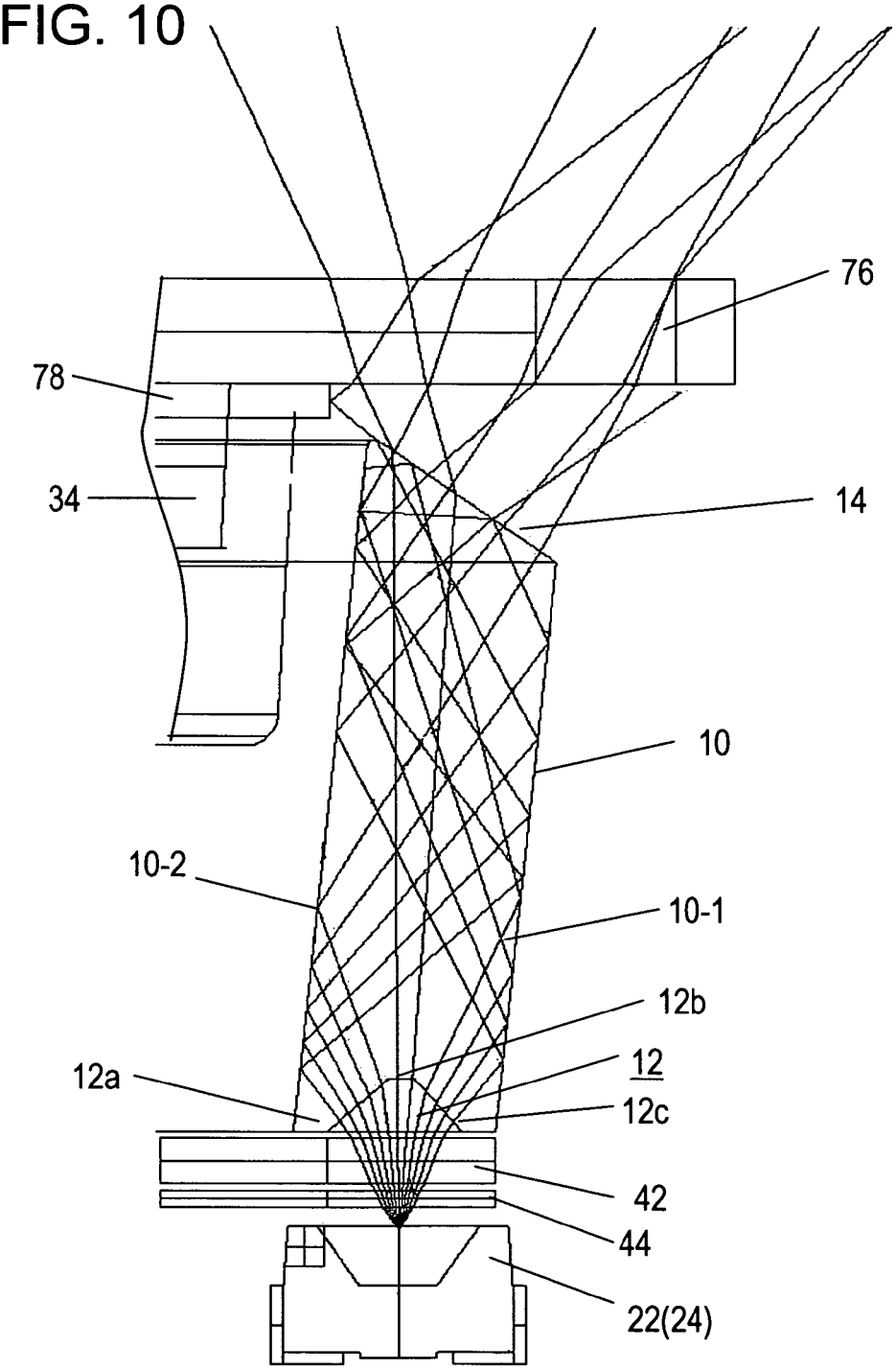
FIG. 10 shows a configuration diagram of the light guide member and the light-emitting device shown in FIG. 9.
Figure 11:
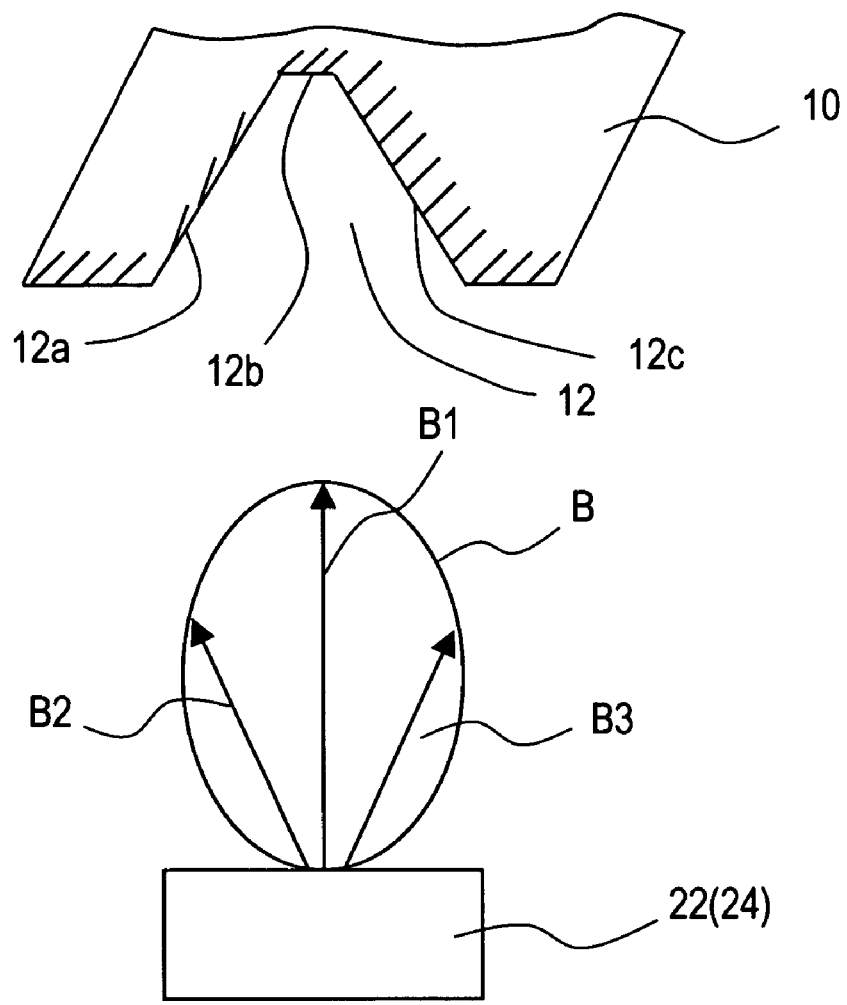
FIG. 11 shows a relation diagram between the emission intensity distribution of the light-emitting device and the lower end portion of the light guide member shown in FIG. 10.
Figure 12:
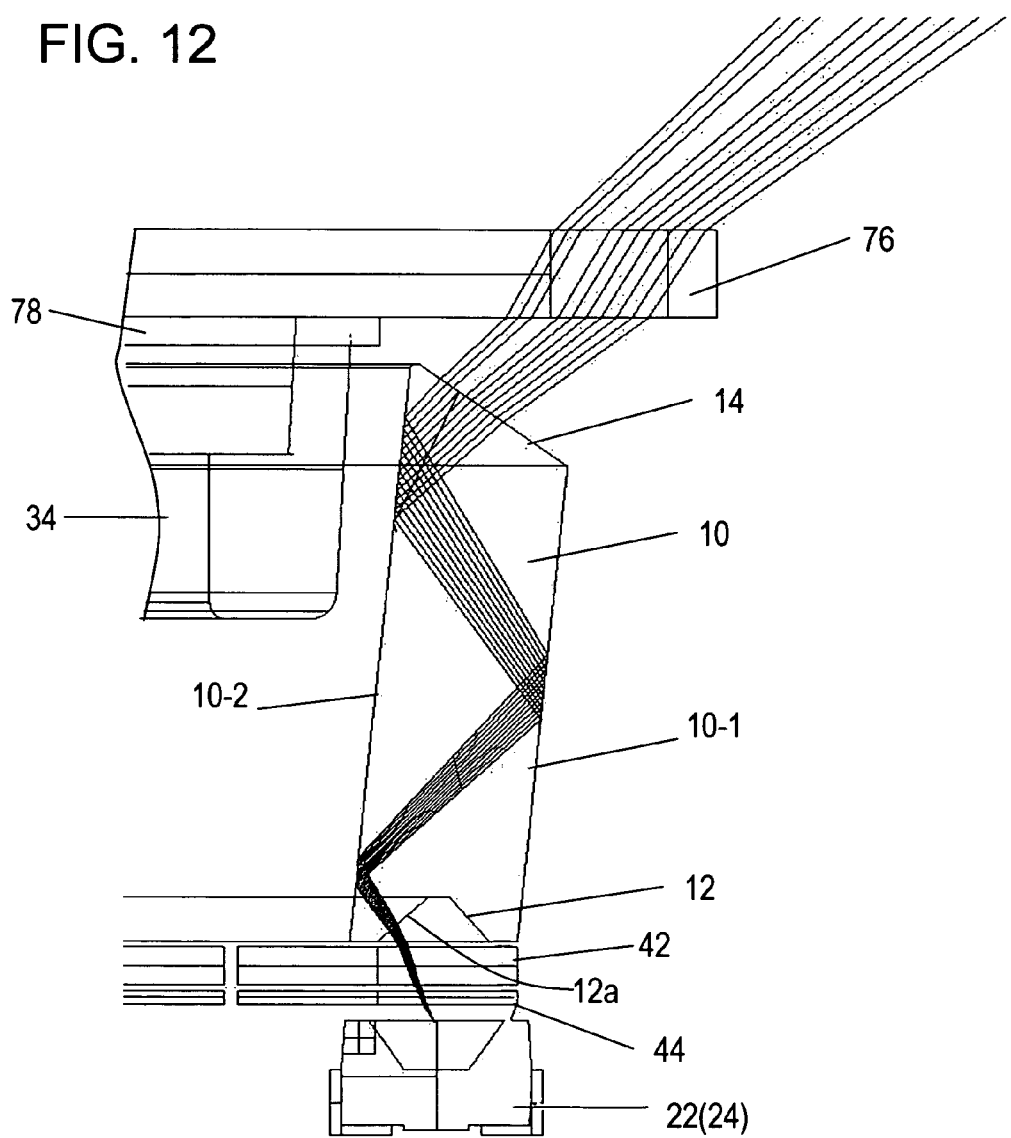
FIG. 12 shows a first operation explanation diagram of the light guide member shown in FIG. 10.
Figure 13:
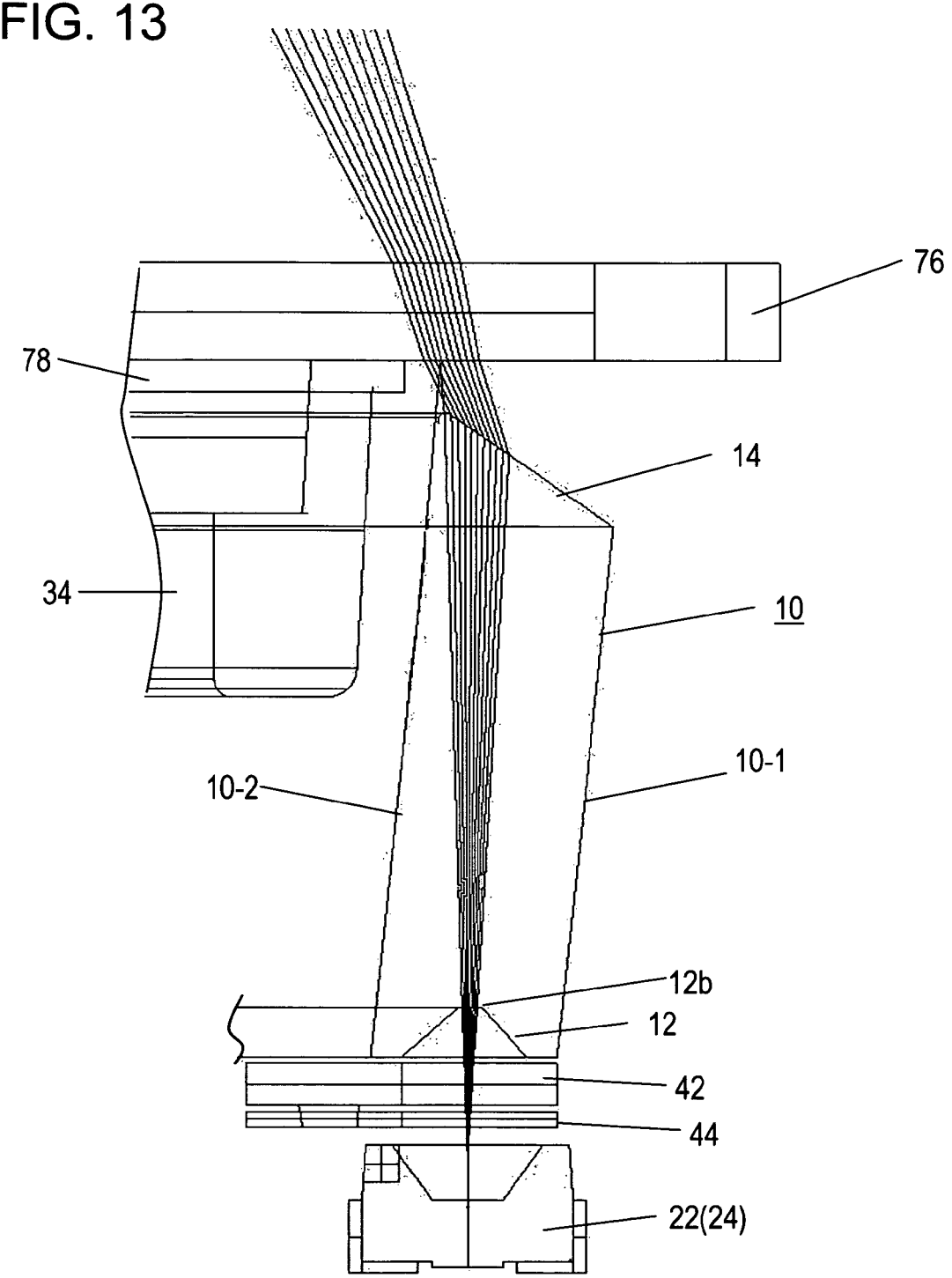
FIG. 13 shows a second operation explanation diagram of the light guide member shown in FIG. 10.
Figure 14:
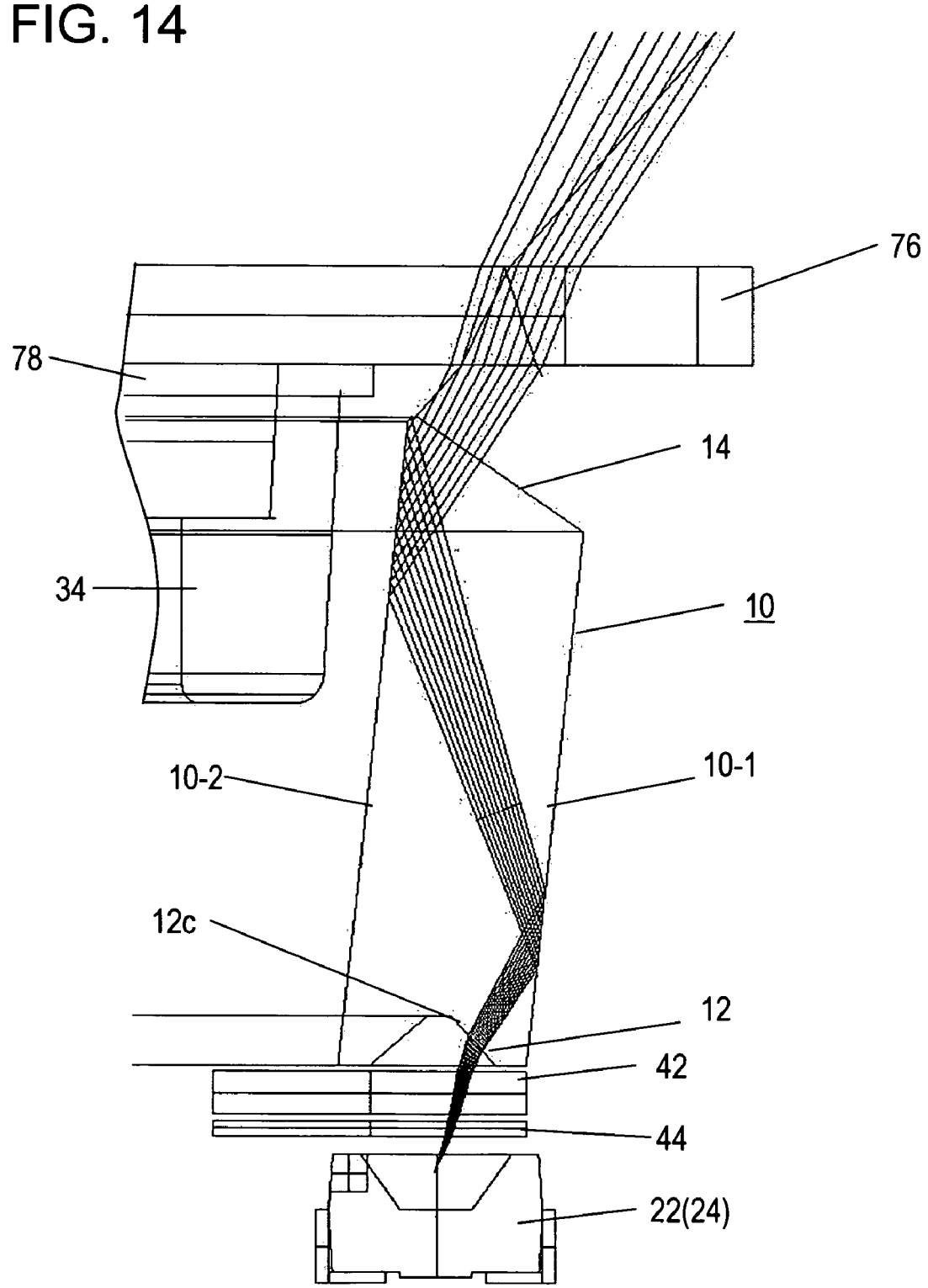
FIG. 14 shows a third operation explanation diagram of the light guide member shown in FIG. 10.

Next, an illumination mechanism including a light guide member will be described. FIG. 9 shows an operation explanation diagram of the light guide member according to one embodiment of the present invention; FIG. 10 shows a detailed configuration diagram of the illumination mechanism shown in FIG. 9; FIG. 11 shows an explanation diagram of a trapezoidal notch of the light guide member shown in FIG. 10; and FIGS. 12 through 14 show explanation diagrams of light guiding and diffusion operations of the light guide member shown in FIG. 10.

In FIG. 9, like parts as shown in FIGS. 1 and 2 are designated by like reference numerals. As shown in FIG. 9, the light guide member 10 guides the light from each light-emitting device 22, 24, which is a point light source, to the visible-light cutoff filter 76 so that the light is split into three.

More specifically, from the light guide member 10, basically, light A3 to the direction of the optical unit 34, light A2 to the longitudinal direction of the light guide member 10, and light A1 to the opposite direction to the optical unit 34 are output. With the provision of the above light guide member 10, each single point light source 22, 24 can behave as if three point light sources exist in the vicinity of the visible-light cutoff filter 76.

As shown in FIG. 10, the light guide member 10 includes an upper slope face 14, two side faces 10-1, 10-2, and a lower trapezoidal groove 12. The lower trapezoidal groove 12 is positioned opposite to the light-emitting device 22, 24 by the intermediary of the polarizing plate 42 and diffusion plate 44, and receives the light from the light-emitting device 22, 24. Also, the upper slope face 14 is a slope face of which height is greater on the optical unit 34 side.

As shown in FIG. 11, an emission intensity distribution B from the light-emitting device 22, 24 has a long (strong) circular arc shape in the upward direction. Namely, the intensity of a light component B1 to the light output direction of the light-emitting device 22, 24 (vertical direction of the device) is stronger than the intensity of light components B2, B3 to the directions to both sides. As shown in FIG. 9, the trapezoidal groove 12 in the light guide member 10 is formed correspondingly to the above intensity distribution B so that the light can basically be regarded as three point light sources on the output side.

More specifically, in order to function as three point light sources by the reflection inside the light guide member 10, the trapezoidal groove 12 is constituted of a flat portion 12b for introducing the light component B1, and a pair of slope face portions 12a, 12c for introducing the light components B2, B3 on the both sides, having gradients corresponding to the directions of the light components B2, B3. The above shapes of trapezoidal groove 12 function to split the light from each point light source 22, 24 into three.

Also, as described later, the respective lengths of the above flat portion 12b and slope face portions 12a, 12c are set so that the light intensity in a predetermined area caused by the light output from light guide member 10 becomes substantially uniform. Here, the length of the flat portion 12b, which receives the maximum intensity of the light component B1, is set shorter than each length of the slope face portions 12a, 12c, which receive light intensity of the light components B2, B3 weaker than the light intensity of the light component B1. By this, depending on the light intensity distribution, the split light amount is adjusted.

The above operation is described referring to FIGS. 12 through 14. As shown in FIG. 12, the component B2 on the left side of the emission intensity distribution B of each light-emitting device 22, 24 is incident to the left side face 10-2 of the light guide member 10, from the left slope face portion 12a of the light guide member 10. The incident light is then reflected on the left side face 10-2, and forwarded to the right side face 10-1 of the light guide member 10. Subsequently, the light forwarded to the right side face 10-1 is reflected on the right side face 10-1, and forwarded again to the left side face 10-2. The light is then reflected on the left side face 10-2 and incident to the upper slope face 14 substantially perpendicularly, and output to the outermost portion of the image capturing range.

Also, as shown in FIG. 13, the central component B1 of the emission intensity distribution B of the light-emitting device 22, 24 is incident to the light guide member 10 from the central flat portion 12b of the light guide member 10. The light is then incident obliquely to the upper slope face 14, and output to the inner most portion of the image capturing range.

Further, as shown in FIG. 14, the component B3 on the right side of the emission intensity distribution B of the light-emitting device 22, 24 is incident to the right side face 10-1 of the light guide member 10, from the right slope face portion 12c of the light guide member 10. The incident light is then reflected on the right side face 10-1, and forwarded to the left side face 10-2 of the light guide member 10. Subsequently, the light forwarded to the left side face 10-2 is reflected on the left side face 10-2 and incident to the upper slope face 14 substantially perpendicularly, and output between the innermost portion and the outermost portion of the image capturing range.

By synthesizing FIGS. 12 through 14, an optical path diagram as shown in FIG. 10 is obtained. Namely, at the trapezoidal groove 12, the light guide member 10 splits the point emission of point light source 22, 24 into three. Using the reflection on the side faces inside the light guide member 10, each split light is output in such behavior as three point light sources existent on the output side of the light guide member 10.

In this case, considering the image capturing range (shown by oblique lines) shown in FIG. 1, the output direction is adjusted at the upper slope face 14 of the light guide member 10. Also, in order to obtain substantially uniform light intensity in the image capturing range, the lengths i.e. the incident widths of, or the incident amount to, the flat portion 12b and the slope face portions 12a, 12c of the trapezoidal groove 12 of the light guide member 10 are adjusted, taking into consideration the emission intensity distribution B of the light-emitting device 22, 24 described earlier in FIG. 11.

Here, to obtain the substantially uniform light intensity, because the emission intensity distribution B of the light-emitting device 22, 24 described in FIG. 11 has stronger light intensity at the center, while weaker light intensity in the periphery, the length of the flat portion 12b of the trapezoidal groove 12 of the light guide member 10 is set shorter than each length of the slope face portions 12a, 12c. Thus, it is structured that the light portion having strong light intensity is incident not only to the flat portion 12b, but also to the slope face portions 12a, 12c.

Also, using the groove 12 having a trapezoidal shape and the upper slope face 14 of the light guide member 10 and the reflection in the light guide member 10, the reflected light and the rectilinear light can be output with diffusion so as to obtain substantially uniform light intensity throughout the image capturing range.

When describing with reference to FIG. 1, the light is irradiated on the image capturing range V of image sensor 30, while the range of uniform light intensity is shown by V1. Although the image capturing range is V, by extracting particularly important features of the image capturing object from the image in the above range V1, feature extraction can be made with high accuracy. Further, by matching the level through level correction, the image outside the range V1 can be used for feature extraction of lower importance.

Hood Structure

Figure 15:
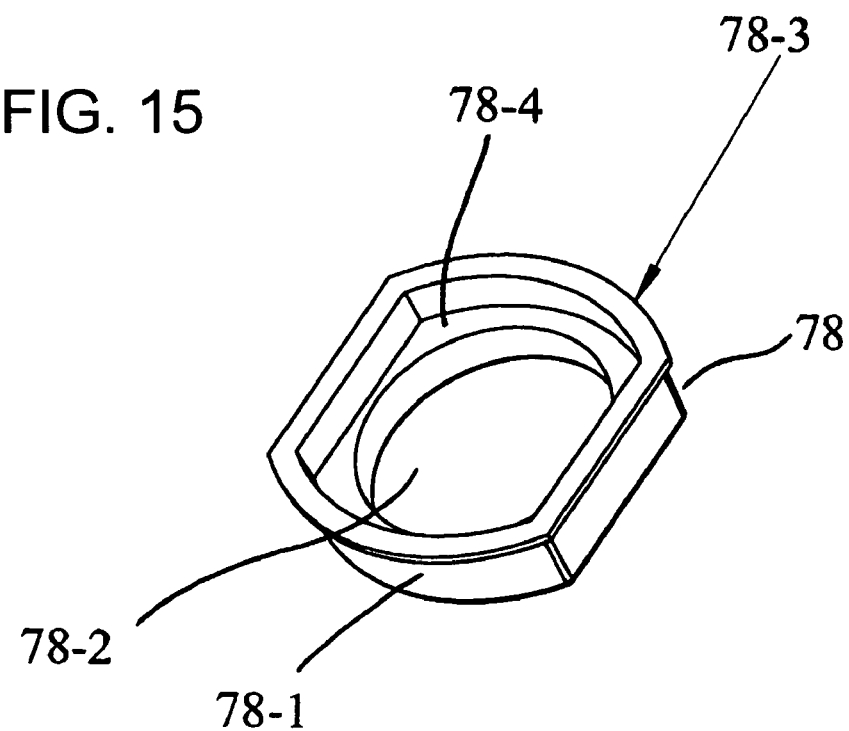
FIG. 15 shows a perspective diagram of the hood shown in FIG. 1, viewed from the upper face side.
Figure 16:
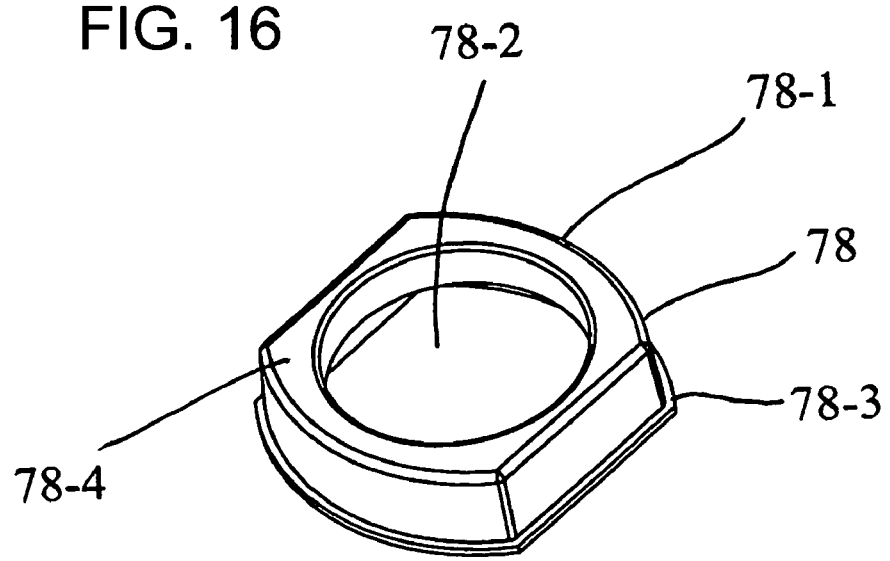
FIG. 16 shows a perspective diagram of the hood shown in FIG. 15, viewed from the lower face side.

FIGS. 15 and 16 show configuration diagrams of the hood of the image capturing apparatus described in FIGS. 1 through 14, and FIG. 17 shows an operation explanation diagram thereof. FIG. 15 is a perspective diagram of the hood viewed from above, while FIG. 16 is a perspective diagram of the hood viewed from below.

As shown in FIGS. 15 and 16, the hood 78 includes a hood outside wall 78-1, a bottom portion 78-4 of hood outside wall 78-1, an exposure hole 78-2 disposed on the bottom portion 78-4, and a flange 78-3 disposed on the uppermost portion of the hood outside wall 78-1.

Figure 17:
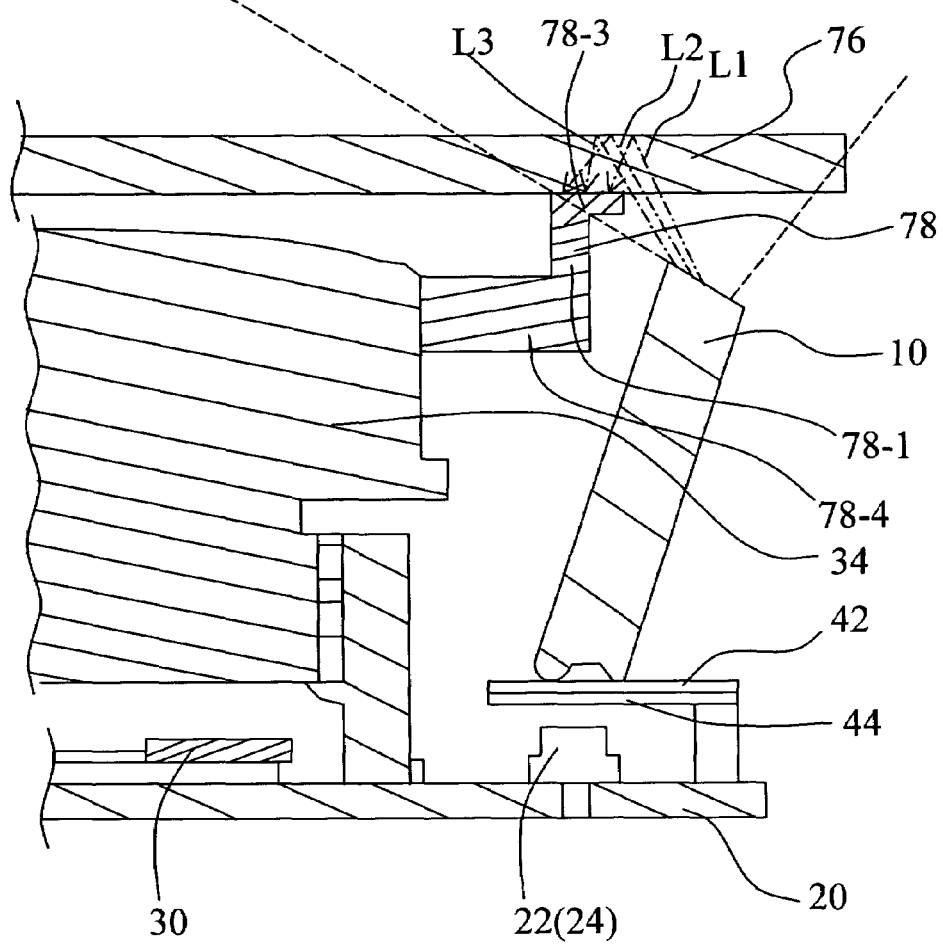
FIG. 17 shows an operation explanation diagram of the hood shown in FIGS. 15 and 16.

As shown in FIG. 17, a top of the optical unit 34 is set at the exposure hole 78-2 on the bottom portion 78-4 of the hood 78. The upper portion of the hood 78 (including the flange 78-3) is attached to the visible-light cutoff filter 76. As having been described in FIGS. 1 through 14, when the image capturing unit 34, 30 and the illumination mechanism 22, 10 are disposed close to each other for the purpose of miniaturization, the light from the illumination mechanism, an output system, is incident to the image capturing system 34, 30, which affects the photographed image.

Therefore, it is necessary to optically separate the output system from the image capturing system, and accordingly, hood 78 is provided. The above hood 78 is formed of a screening member that does not transmit light. With the provision of the bottom portion 78-4, the hood outside wall 78-1 is positioned in the direction of the light guide member 10. The hood outside wall 78-1 disposed substantially perpendicularly screens the light which is either directly incident from the light guide member 10 or reflected on the lower face of the visible-light cutoff filter 76 so as not to be incident to the image capturing unit 34, 30. Also, as shown in FIG. 1, the hood outside wall 78-1 restricts the incident range of the reflected light from the object, as shown by the oblique lines in FIG. 1.

Further, the flange 78-3 disposed on the upper portion of the hood outside wall 78-1 extends to the direction of the light guide member 10. As shown in FIG. 17, the flange 78-3 intercepts reflected light L1, L2 and L3, being reflected on the upper face of the visible-light cutoff filter 76 among the light output from the light guide member 10, from being incident to the image capturing unit 34, 30. Such the reflected light L1, L2, L3 causes image capturing noise because of not irradiating the object. Therefore, interception by means of the flange 78-3 is effective to obtain a clear photographed image.

As such, the hood 78 cuts off light so as to prevent the light outside the predetermined image capturing range (shown by the oblique lines in FIG. 1) from entering the optical unit 34, and also prevents the light which does not contribute to the irradiation on the object among the light output from the light guide member 10 from invading into the optical unit 34.

Configuration of Distance Sensor

Figure 18:
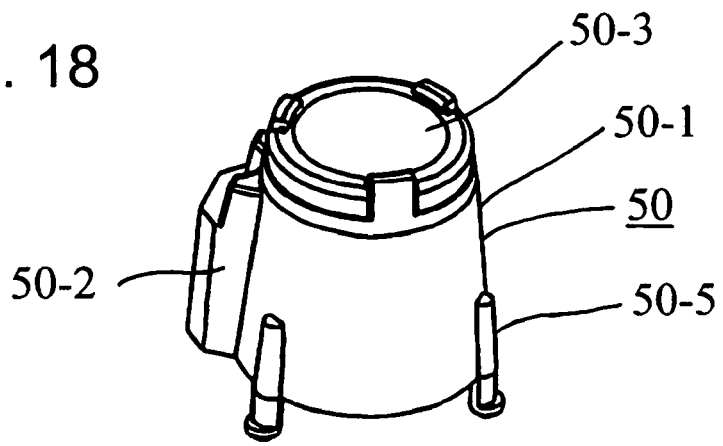
FIG. 18 shows a configuration diagram of the aperture shown in FIGS. 1 and 2.
Figure 19:
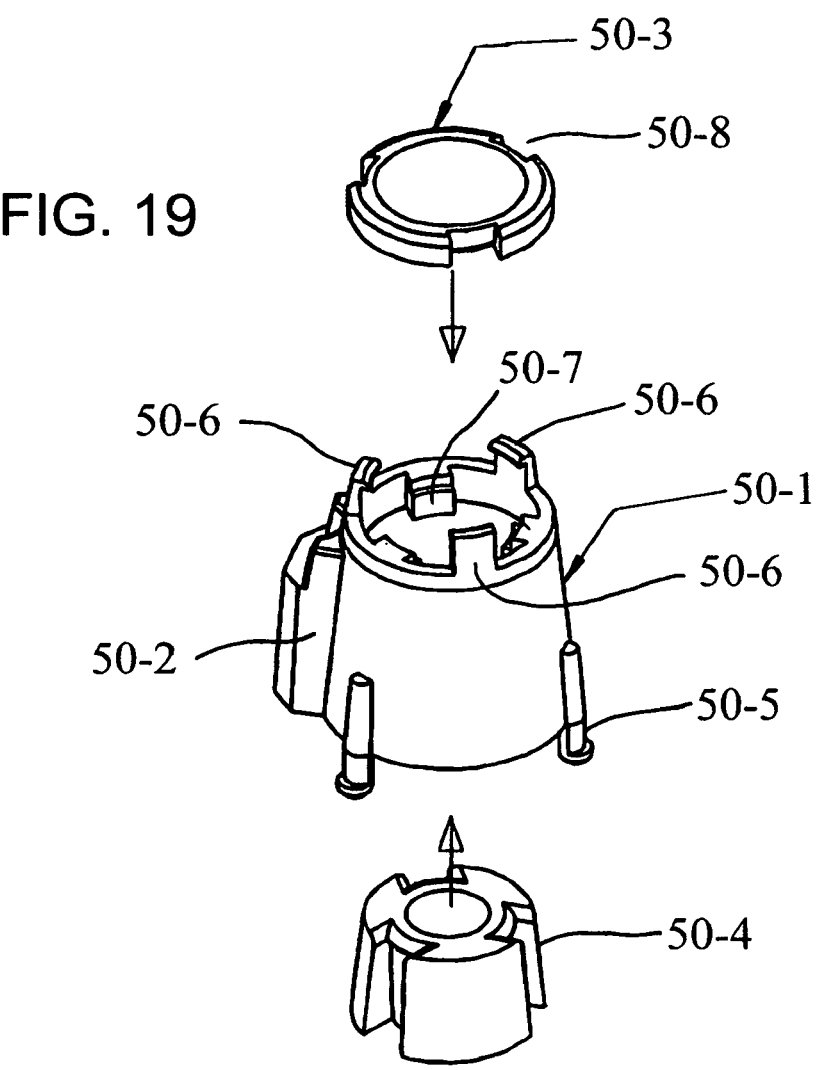
FIG. 19 shows an exploded structural view of the aperture shown in FIG. 18.
Figure 20:
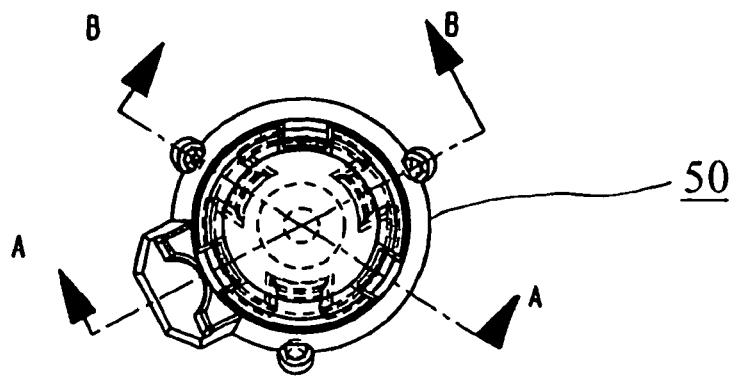
FIG. 20 shows a top plan view of the aperture shown in FIG. 18.
Figure 21:
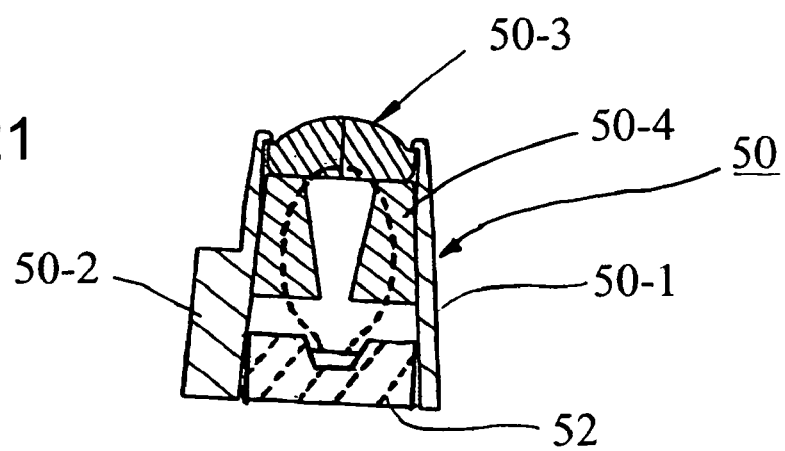
FIG. 21 shows an A-A cross-section of the aperture shown in FIG. 20.

FIG. 18 shows a configuration diagram of an aperture of a distance sensor; FIG. 19 shows an exploded structural view of the aperture shown in FIG. 18; FIG. 20 shows a top plan view of the aperture shown in FIG. 18; FIG. 21 shows an A-A cross-section of the aperture shown in FIG. 20; and FIG. 22 shows a B-B cross-section of the aperture shown in FIG. 20.

As shown in FIGS. 18, 19, the aperture 50 includes a holder 50-1, a lens 50-3 and a condenser 50-4. The holder 50-1 is formed of a circular cylinder for cutting off external light. On the upper portion of the holder 50-1, support members 50-7 and pressing members 50-6 of the lens 50-3 are provided. Further, a support member 50-2 of the light guide member 10 is provided on the side face of the holder 50-1, and a furnishing leg 50-5 to a substrate 20 are provided on the lower portion of the holder 50-1. Meanwhile, the lens 50-3 includes notches 50-8 for fitting the pressing members 50-6 of the holder 50-1 therein.

As shown in FIG. 19, the condenser 50-4 is fitted in from the lower portion of the holder 50-1, so as to be positioned at the lens support members 50-7 of the holder 50-1. Also, the pressing members 50-6 of the holder 50-1 are fitted in the notches 50-8 of the lens 50-3, and the lens 50-3 is pushed into the upper portion of the holder 50-1. Thus, the lens 50-3 is supported by the holder support members 50-7, and also pressed by the pressing members 50-6 of the holder 50-1.

Figure 22:
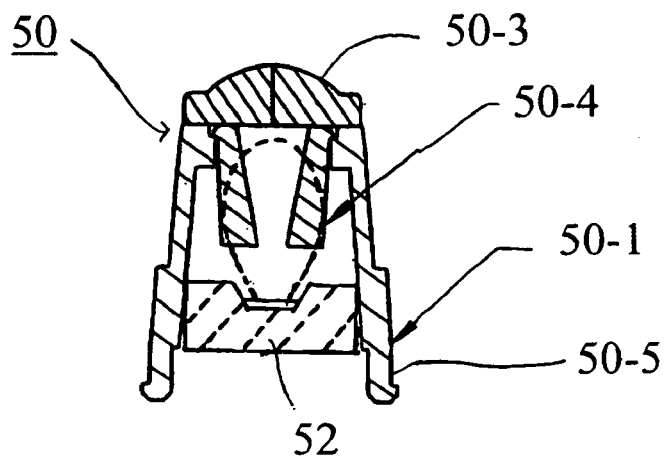
FIG. 22 shows a B-B cross-section of the aperture shown in FIG. 20.

Next, the operation of the above aperture 50 is described referring to FIGS. 20 through 22. As shown FIGS. 21, 22, in the A-A cross section and the B-B cross section of FIG. 20, the condenser 50-4 forms an optical path of an upside-down trapezoidal shape at the lower portion of the lens 50-3. The distance-measuring light-emitting device 52 is constituted of a light emitting diode (LED), having emission distribution shown by the dotted lines in the above figures.

The condenser 50-4 intercepts the light existent relatively in the periphery of the emission distribution, whereas the condenser 50-4 passes the light at the center having strong light intensity to the lens 50-3. In order to collect the light having such the emission distribution to spot light, there is employed a configuration such that the emitted light of the light-emitting device 52 having large power is converted into parallel light by means of a diffusion sheet, etc., and incident to the converging lens 50-3. However, in such the configuration, it is necessary to provide the diffusion sheet, as well as a light-emitting device of large power.

According to the present embodiment, using the condenser 50-4, the light incident on the lens 50-3 is shaped to have an upside-down trapezoidal distribution, being deformed from the emission distribution of the distance-measuring light-emitting device 52. More specifically, by means of the condenser 50-4 for generating an optical path having a narrowed downside and a broadened upside, diffused reflected light rays of the LED are selected, converged and output to one direction. Thus, it becomes possible to obtain sufficient irradiation amount even when a power-saving light-emitting device having a small emission amount is employed.

Figure 23:
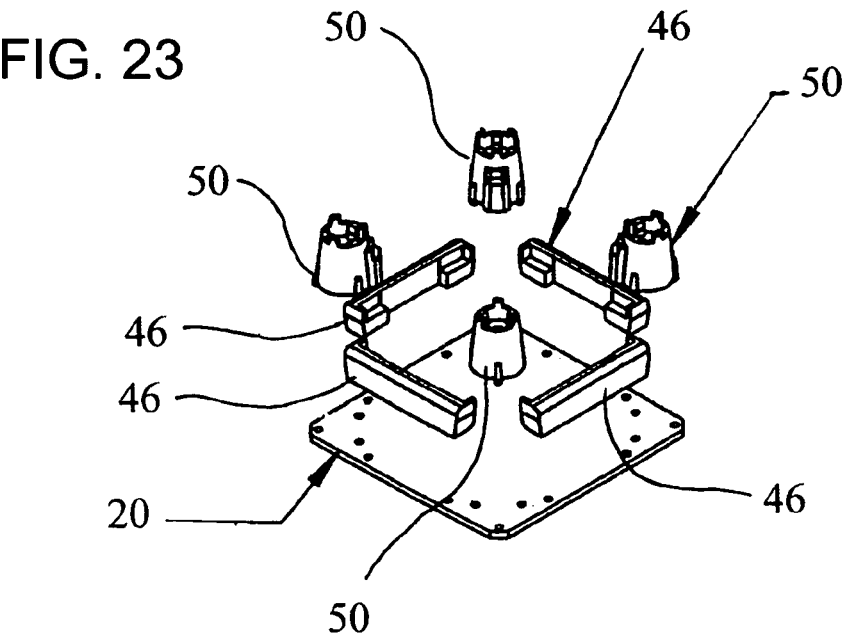
FIG. 23 shows a configuration diagram of the aperture and the diffusion/polarization plate mount table shown in FIGS. 1 and 2.
Figure 24:
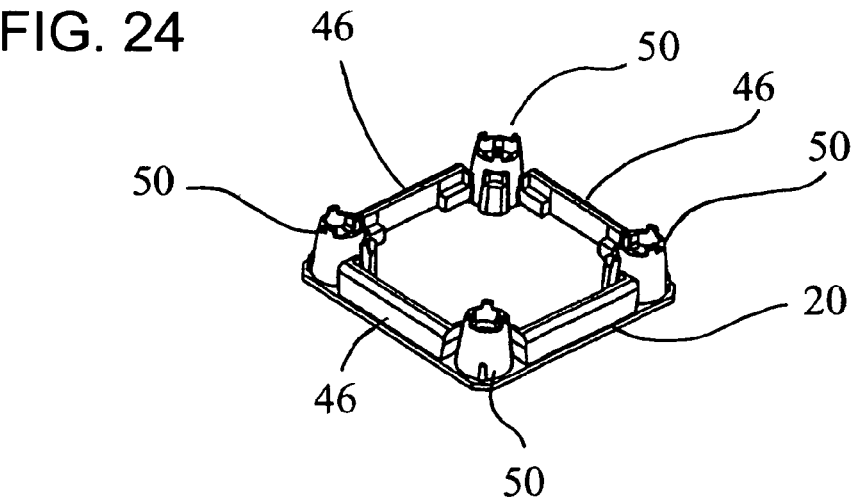
FIG. 24 shows a mounting diagram of the aperture and the diffusion/polarization plate mount table shown in FIGS. 1 and 2.

FIGS. 23, 24 show assembly diagrams of the apertures 50 to the substrate 20. It is assumed that the distance-measuring light-emitting devices 52 are mounted at the four corner of the substrate 20. Corresponding to the above distance-measuring light-emitting devices 52, apertures 50 are fitted to the substrate 20 with the legs 50-5 thereof. Further, the diffusion/polarization plate mount tables 46 are fitted therebetween, with adhesion, etc.

With the provision of the apertures 50 including the condensers 50-4 for generating an optical path having a narrowed downside and a broadened upside of the light emitted from the distance-measuring light-emitting devices 52, diffused reflected light rays of the LED can be selected, converged and output to one direction. Thus, it becomes possible to obtain sufficient irradiation amount even when using a power-saving light-emitting device of a small emission amount, and to miniaturize a distance sensor irradiating spot light, thereby contributing to the miniaturization of the image capturing apparatus. Moreover, even when mounting on the substrate 20, sufficient spot light can be obtained.

Image Processing Configuration

Figure 25:
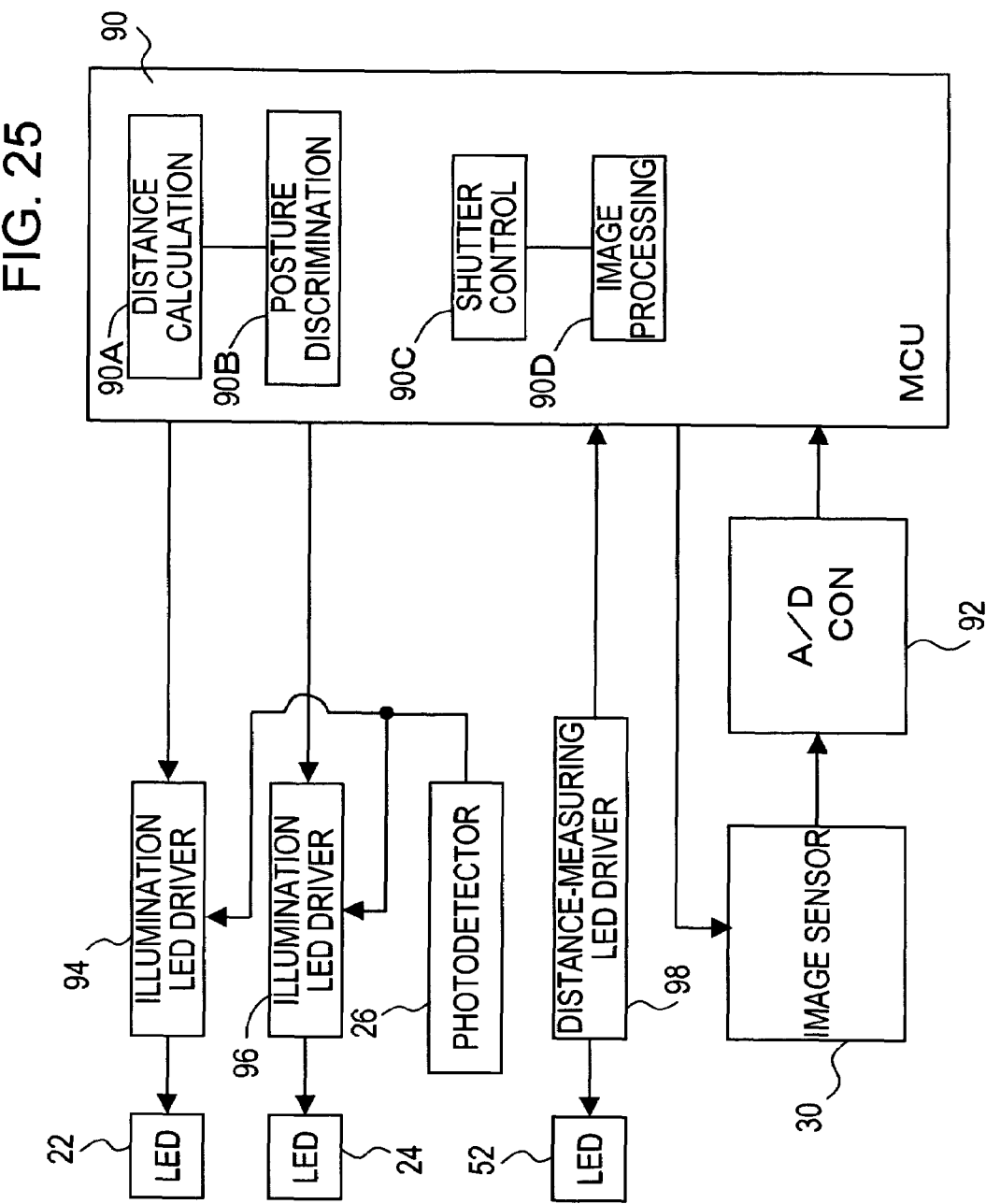
FIG. 25 shows a block diagram of a control circuit for the image capturing apparatus shown in FIG. 1.
Figure 26:
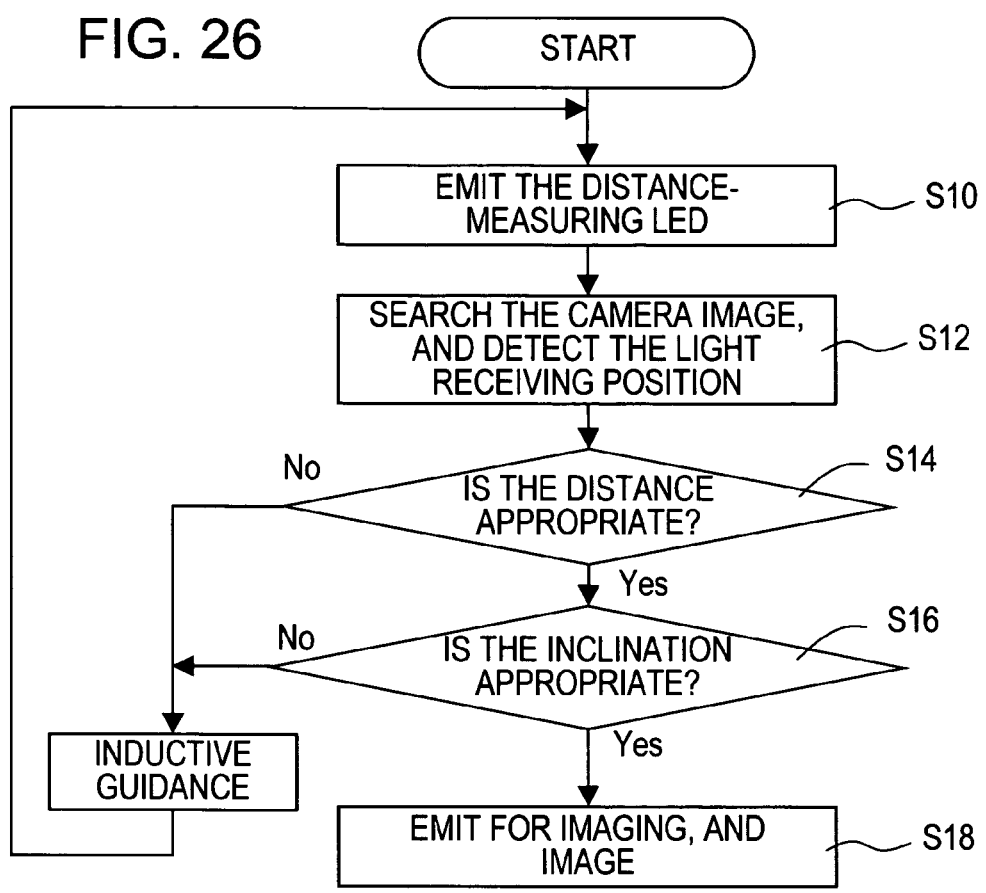
FIG. 26 shows an image capturing process flowchart of the control circuit shown in FIG. 25.
Figure 27:
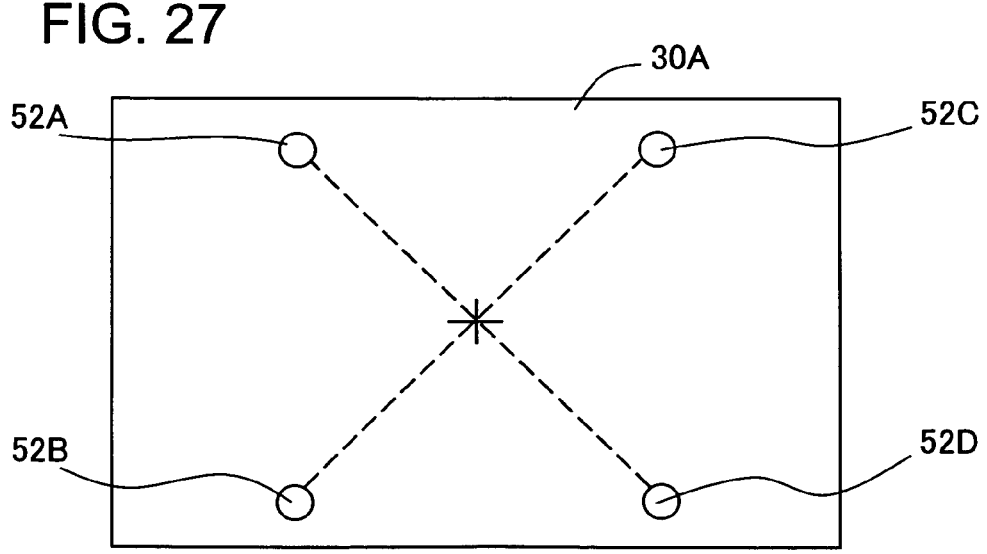
FIG. 27 shows an explanation diagram of distance measurement operation using the configuration shown in FIG. 25.

FIG. 25 shows a block diagram of a captured image processing apparatus according to one embodiment of the present invention. FIG. 26 shows a flowchart of the captured image processing in the above image processing apparatus. Also, FIG. 27 shows an explanation diagram of distance measurement operation.

As shown in FIG. 25, a drive/process system in the image capturing apparatus includes a first illumination LED driver 94 for driving the first light-emitting device 22, a second illumination LED driver 96 for driving the second light-emitting device 24, a distance-measuring LED driver 98 for driving the distance-measuring light-emitting devices 52, an analog/digital converter 92 for converting the analog output of each pixel from the image sensor 30 to a digital value, and a microcontroller 90.

As described in FIG. 4, the first and second illumination LED drivers 94, 96 perform APC (automatic power control) in each light emission period, according to the light intensity received in photodetector device 26. Microcontroller (MCU) 90 includes MPU (microprocessor), ROM (read-only memory) and RAM (random access memory), and executes processing including distance measurement 90A, posture discrimination 90B, shutter control 90C and image processing 90D.

Referring to FIG. 26, image capturing processing in MCU 90 is described below.

(S10) MCU 90 drives the distance-measuring light-emitting devices (LED) 52 via distance-measuring LED driver 98. By this, four distance-measuring light-emitting devices 52 described in FIGS. 2 and 3 emit light. As shown in FIG. 1, the image sensor 30 photographs an image in the image capturing range. Here, since the illumination light-emitting devices 22, 24 are not driven, the image sensor 30 receives only the reflected light from the object in the image capturing range corresponding to the light emitted from the distance-measuring light-emitting devices 52. In FIG. 27, there are shown the positions of the reflected light 52A, 52B, 52C and 52D in an image 30A of the image sensor 30, being received from the object in the image capturing range corresponding to the light emitted from each distance-measuring light-emitting device 52. The above positions deviate depending on the inclination of the object (for example, palm).

(S12) Next, by means of the analog/digital (A/D) converter 92, each analog light reception amount in image 30A of the image sensor 30 is converted into a digital value, and then stored into the memory of MCU 90. MCU 90 searches the image data in the memory, and detects the positions of the above reflected light 52A, 52B, 52C and 52D.

At this time, since the four distance-measuring light-emitting devices 52 are disposed diagonally from the center of the image (image capturing range) as shown in FIGS. 3 and 27, by searching on the straight lines, as shown by the dotted lines in FIG. 27, the positions of the four points can be detected from the pixel luminance on the straight lines. Further, because the light-emitting devices 52 are disposed in the farthest positions on the diagonal lines with sufficient distances, it is possible to detect the positions farthest from the center in the image. From the above four positions, MCU 90 detects the distance and the inclination of the object using the triangulation measurement method. Namely, by use of the positions from the center of the image sensor 30, a distance at each of the four points is calculated, and the inclination (in four directions) can be detected from the distance difference of the four points.

(S14) MCU 90 decides whether the distance to the image capturing object is appropriate (whether the object is positioned in the image capturing range with a predetermined focal distance). If the distance to the image capturing object is not appropriate, MCU 90 displays a guidance message on a non-illustrated display portion. For example, a guidance message of "Put the object (palm) closer." or "Put the object (palm) further." is displayed.

(S16) If the distance is appropriate, MCU 90 decides whether the inclination of the image capturing object is appropriate. For example, when image capturing a flat portion (palm, etc.) of the object, it is decided whether the inclination is within a tolerable range. If the inclination of the image capturing object is not appropriate, MCU 90 displays a guidance message on the non-illustrated display portion. For example, in case that a palm is the object, a guidance message of "Open your hand." or the like is displayed.

(S18) If the inclination is appropriate, MCU 90 instructs the illumination LED drivers 94, 96 to emit light. Thus, the light-emitting devices 22, 24 emit light, so as to irradiate the object. Subsequently, MCU 90 drives a non-illustrated electronic shutter of the image sensor 30, and photographs the image in the image capturing range. MCU 90 then stores the image into the memory via A/D converter 92. Then, the feature is extracted from the above image. For example, in case of extraction of the aforementioned blood vessel image, the blood vessel image is extracted from the image.

As such, the image sensor 30 is also used for the distance-measuring photodetector portion to detect whether the image capturing object lies at the focal distance, or the inclination thereof. Thus, in the distance measurement mechanism, it is sufficient to provide the distance-measuring light-emitting devices 52 without particularly providing photodetector devices for distance measurement. This contributes to reduction of cost, and miniaturization as well, due to a reduced number of mounting components.

Also, because four distance-measuring light-emitting devices 52 are disposed diagonally from the center of the image (image capturing range), the positions of the four points can be detected by searching the image data stored in the memory as shown by the dotted lines in FIG. 27, and thus, detection processing becomes easy. Further, because the distance-measuring light-emitting devices 52 are disposed in the furthest positions on the diagonal lines with sufficient distances, it is possible to detect the positions in the image far from the center even the apparatus is miniaturized, and detection of the inclination can be performed accurately.

Another Image Capturing Apparatus

Figure 28:
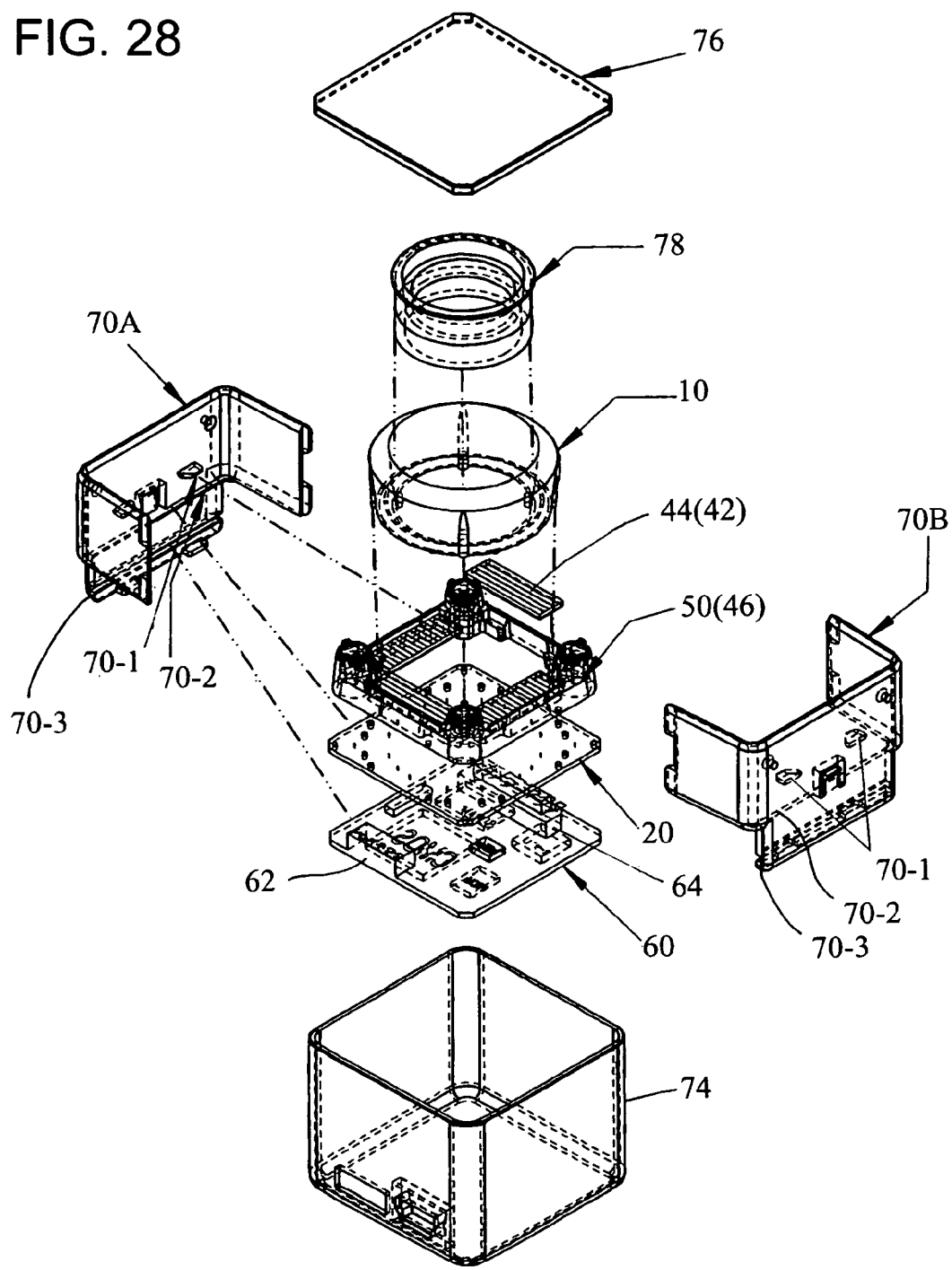
FIG. 28 shows an exploded structural view of an image capturing apparatus according to another embodiment of the present invention.
Figure 29:
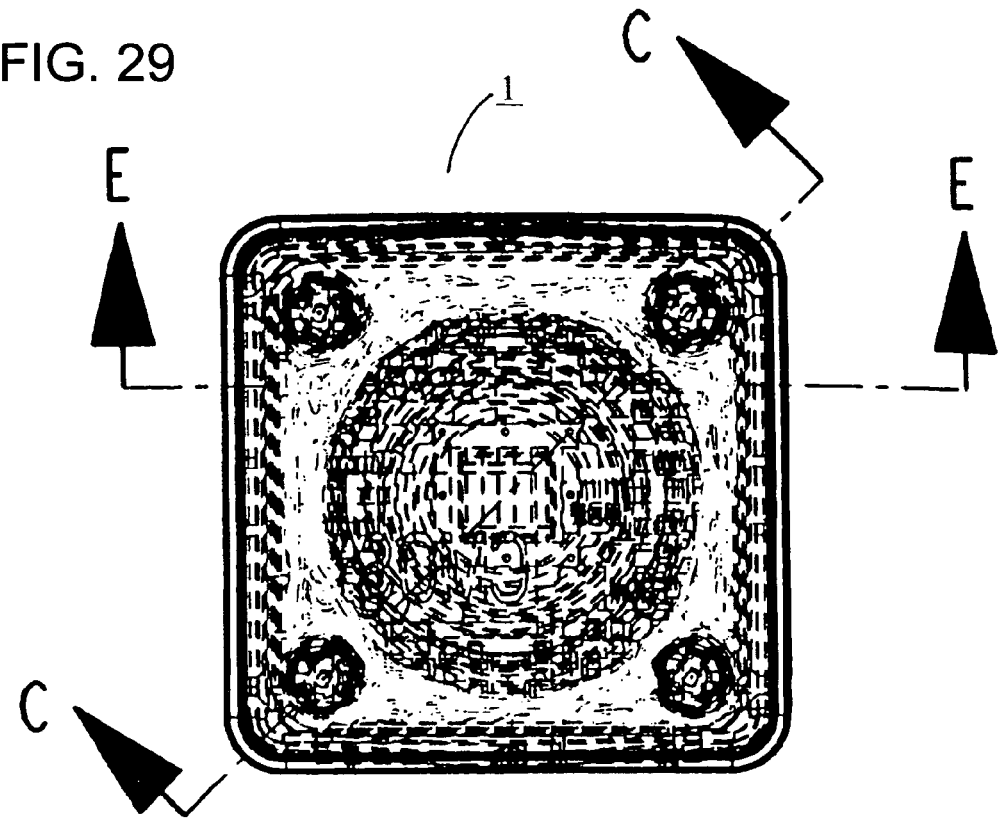
FIG. 29 shows a top plan view of the image capturing apparatus shown in FIG. 28.
Figure 30:
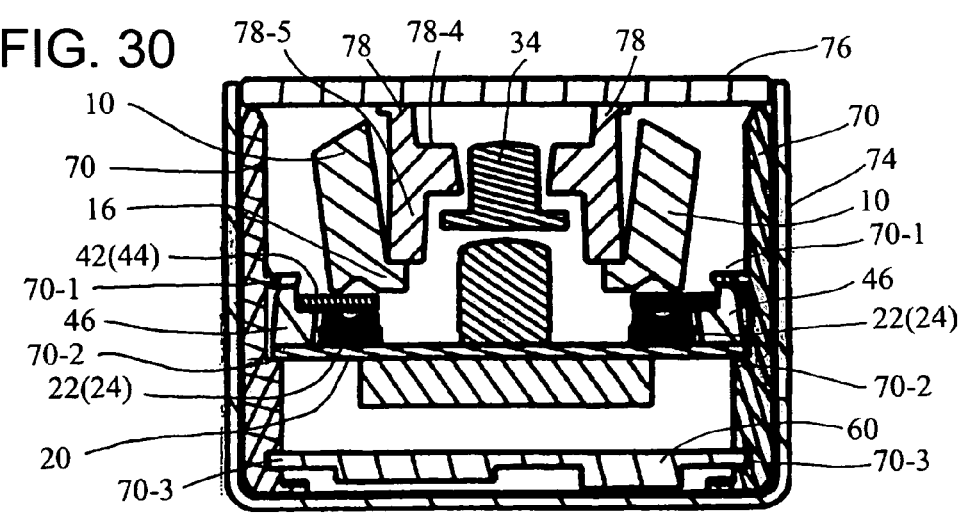
FIG. 30 shows an E-E cross section of the image capturing apparatus shown in FIG. 29.
Figure 31:
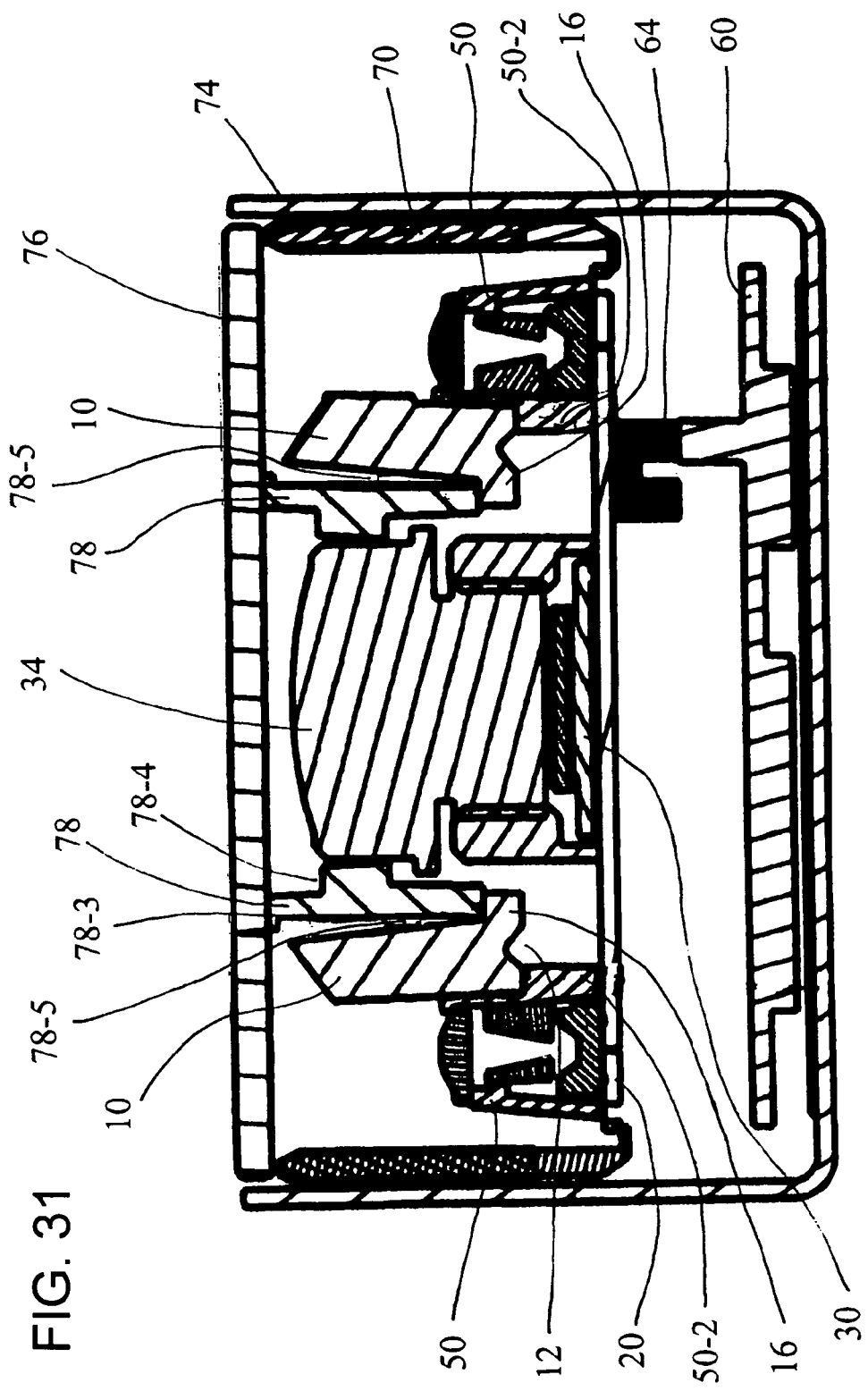
FIG. 31 shows a C-C cross section of the image capturing apparatus shown in FIG. 29.

FIG. 28 shows an exploded structural view of an image capturing apparatus according to another embodiment of the present invention; FIG. 29 shows a top plan view of the image capturing apparatus shown in FIG. 28; FIG. 30 shows an E-E cross section of the image capturing apparatus shown in FIG. 29; and FIG. 31 shows a C-C cross section of the image capturing apparatus shown in FIG. 29.

In FIG. 28, like parts shown in FIGS. 1 through 8 are designated by like reference numerals. Although not shown in FIG. 28, the image sensor 30 such as a CMOS image sensor and the polarizing plate 32 are mounted at the center of the camera substrate 20, and a plurality of light-emitting devices 22, 24 and photodetector devices 26 are mounted in the periphery of the image sensor 30 on the camera substrate 20, similarly to FIGS. 2 and 3. Further, at the four corners of the camera substrate 20, four distance-measuring light-emitting devices 52 are provided for measuring the distance to the object. In short, on a single camera substrate 20, there are provided the illumination system 22, 24, 26 and the image capturing system 30, 32 for image capturing the object, as well as the distance measurement system 52.

In the upper direction of light-emitting devices 22, 24 of the camera substrate 20, there are provided four diffusion plates 44 and four polarizing plates 42. The above diffusion plates 44 and polarizing plates 42 are respectively fixed onto diffusion/polarization plate mount tables 46 being attached on the four sides of the camera substrate 20, as will be described later. Each diffusion plate 44 diffuses, to a certain extent, the emission distribution of the directive light emitted from the first and second light-emitting devices 22, 24. Each polarizing plate 42 converts natural light emitted from the first and second light-emitting devices 22, 24 to linearly polarized light.

In the upper direction of the four polarizing plates 42, a ring-shaped light guide member 10 is provided. Light guide member 10 is formed of, for example, resin, and guides the light from the first and second light-emitting devices 22, 24 of the camera substrate 20 in the upward direction, so as to irradiate the object with uniform light. To fit the arrangement of the light-emitting devices 22, 24 of the camera substrate 20, the light guide member 10 has a ring-shaped structure. As having been described in FIG. 9 and after, the light guide member 10 guides the light emitted from the first and second light-emitting devices 22, 24 to the upward direction, so that the object is irradiated with uniform light.

Further, an optical unit 34 (refer to FIGS. 30, 31) is attached to the camera substrate 20 on the image sensor 30 disposed in the approximate center of the camera substrate 20, and inside the ring-shaped light guide member 10. The optical unit 34 is constituted of a lens optical system such as a converging lens.

An aperture 50 is mounted on the distance-measuring light-emitting device 52 of the camera substrate 20. As will be described later in FIGS. 32 and 33, the aperture 50 shuts off diffusion of light to other directions so as to guide the light emitted from the distance-measuring light-emitting devices 52 to the object direction.

Separately from the camera substrate 20, a control substrate 60 is provided. The control substrate 60 is provided for connecting with the outside, and includes an external connector 62 and a camera connector 64 for connecting with the camera substrate 20. The above control substrate 60 is disposed on the lower portion of the camera substrate 20, and electrically connected with the camera substrate 20 using the camera connector 64.

Then, the image sensor 30, light-emitting devices 22, 24, photodetector devices 26 and distance-measuring light-emitting devices 52 are mounted on the camera substrate 20. Also, the above camera substrate 20, diffusion/polarization plate mount tables 46, diffusion plates 44, polarizing plates 42, apertures 50, optical unit 34, light guide members 10, hood 78, and control substrate 60 are attached to holder assemblies 70A, 70B, and thus a camera portion is assembled.

As shown in FIG. 28 and FIG. 30 illustrating the E-E cross section shown in FIG. 29, a pair of holder assemblies 70A, 70B includes slots 70-3 in the lower portion thereof for inserting the control substrate 60, and support members 70-2 at the center for supporting the camera substrate 20, and protrusions 70-1 above the support members 70-2 for inserting the diffusion/polarization plate mount tables 46.

Meanwhile, as shown in FIGS. 30, 31, the light guide member 10 includes a projection block 16 in the vicinity of the lower groove 12. Further, the hood 78 includes a bottom portion 78-4, hood outside wall 78-1, flange 78-3 disposed on the upper portion of the hood outside wall 78-1, and pressing block 78-5 disposed on the lower portion.

Referring to FIGS. 29, 30 and 31, assembly operation according to the above configuration will be described. Similar to FIG. 2, the diffusion/polarization plate mount tables 46 in integration with the aperture 50, which will be described later, are fitted to the camera substrate 20, having the image sensor 30, light-emitting devices 22, 24, photodetector devices 26 and distance-measuring light-emitting devices 52 mounted thereon, by inserting the legs 50-5 of the aperture 50. To the above diffusion/polarization plate mount tables 46, the diffusion plate 44 and polarizing plate 46 are fitted in advance with adhesion, etc.

Next, the control substrate 60 is connected to the above camera substrate 20 with a connector, and from the both sides of the above assembled body, the holder assemblies 70A, 70B are fitted. At this time, as shown in FIG. 30, the control substrate 60 is inserted into the slots 70-2 of the pair of the holder assemblies 70A, 70B. Also, the camera substrate 20 is fitted to the support member 70-2 and also the diffusion/polarization plate mount tables 46 are fitted to the protrusion 70-1 so as to be sandwiched therebetween.

As shown in FIG. 31, subsequently, the above assembled body is inserted into the case 74, and thereafter, the optical unit 34 is set to the camera substrate 20. Also, the light guide member 10 is fitted so that the lower portion of the light guide member 10 rides on the support block 50-2 of the aperture 50. Then, the hood 78 is fitted in such a manner that the lower block 78-5 of the hood 78 rides on the projection block 16 of the light guide member 10. Finally, the visible-light cutoff filter plate 76 is pasted on the side face of the case 74.

As such, the support members 70-2, 70-3 for supporting the substrates 20, 60 are disposed on the holder assemblies 70A, 70B constituting the side plates. Also, the aperture 50 of the distance sensor, the light guide member 10 and the hood 78 are mutually engaged and pressed by the uppermost visible-light cutoff filter plate 76. With the above structure, adhesion points are remarkably reduced, and in particular, a process of coating an adhesive agent and pasting inside the case 74 is eliminated.

As a result, a small-sized image capturing apparatus of which sizes are, for example, on the order of 3.5 cm square can be assembled, substantially without adhesion process. In case of using the adhesion process, coating of an adhesive agent on extra portions may produce a product defect. Also, the adhesion process is not preferable in view of workability because it requires approximately one hour to finish drying even the adhesion is correctly made.

Moreover, when different types of adhesive agents are used for a variety of components, miscibility becomes a problem, and the adhesive agent types are restricted. Accordingly, assembling without any adhesion process is effective in preventing the occurrence of defective products, and in increasing workability.

Figure 32:
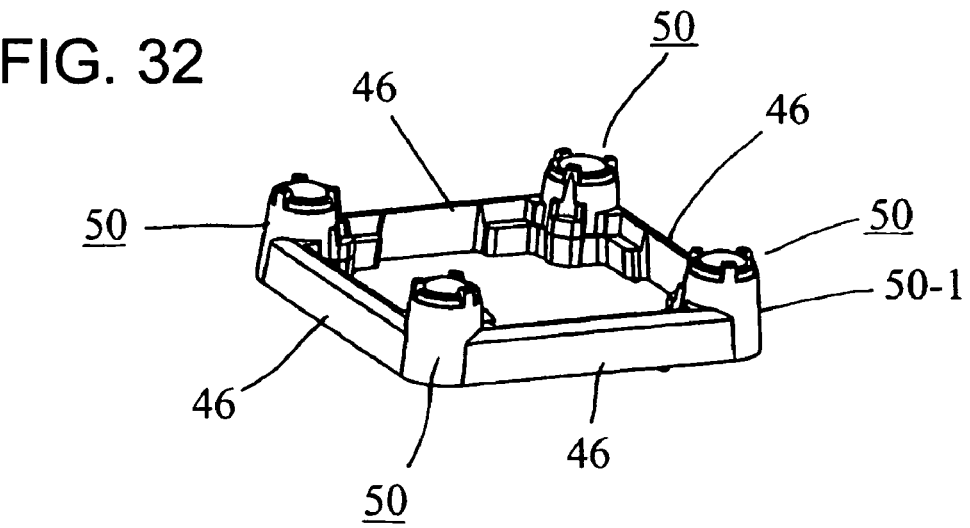
FIG. 32 shows a configuration diagram of the aperture and the diffusion/polarization plate mount table shown in FIG. 25.
Figure 33:
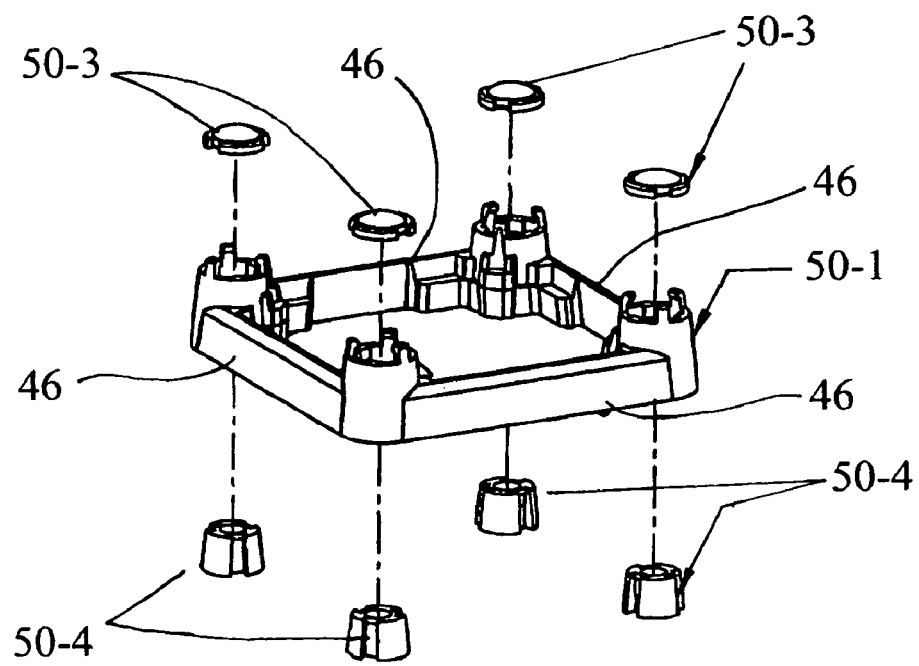
FIG. 33 shows an exploded structural view of the aperture and the diffusion/polarization plate mount table shown in FIG. 32.
Figure 34:
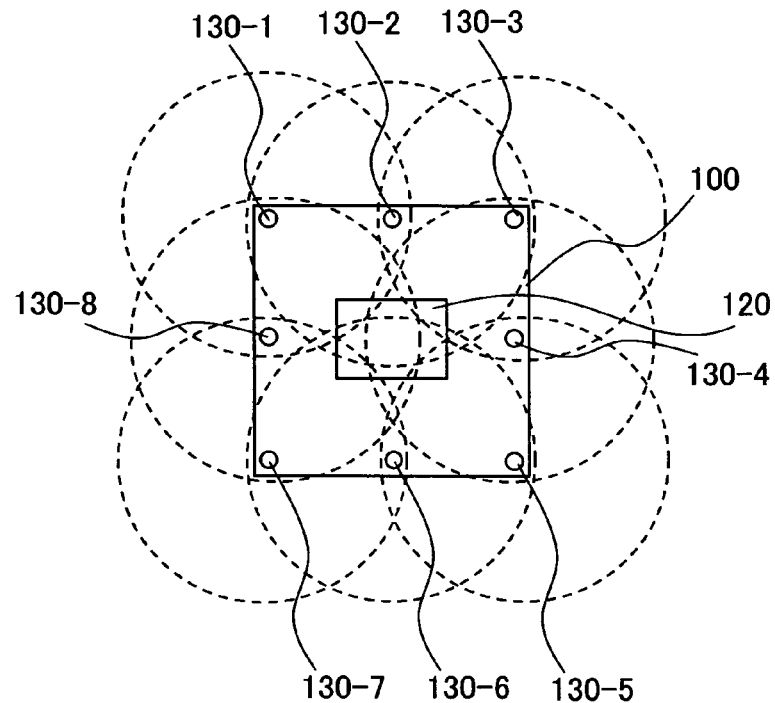
FIG. 34 shows an explanation diagram of an illumination configuration in the conventional image capturing apparatus.
Figure 35:
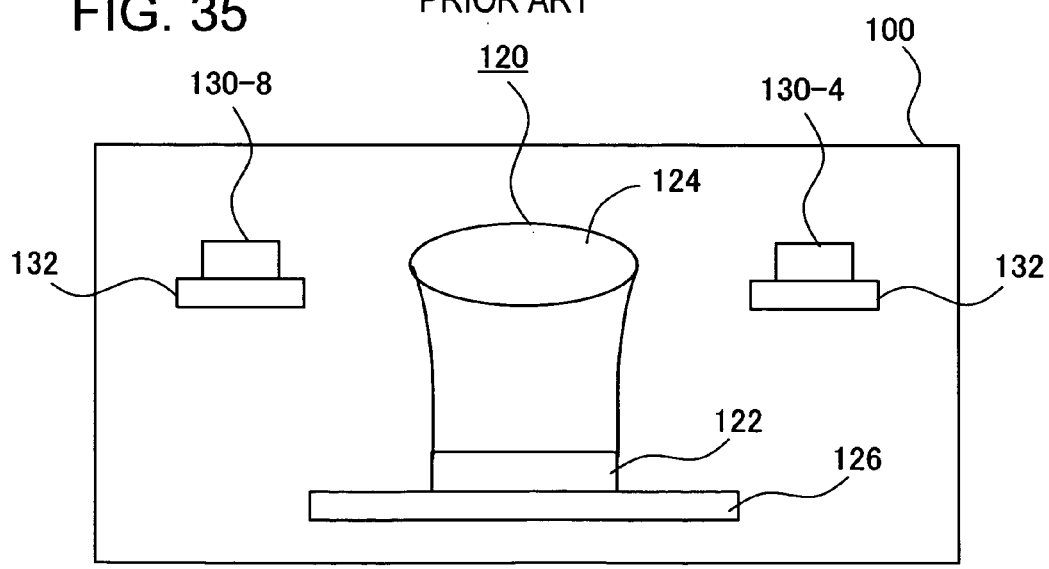
FIG. 35 shows a configuration diagram of the conventional image capturing apparatus.

Next, a configuration to increase workability is described. FIGS. 32 and 33 are configuration diagrams of diffusion/polarization plate mount tables 46 and apertures 50 shown in FIGS. 28 through 31. As shown in FIG. 33, four holders 50-1 of the apertures 50 are integrally formed with four diffusion/polarization plate mount tables 46 so as to be coupled together. For example, the coupled four holders 50-1 of the apertures 50 are integrally formed with the four diffusion/polarization plate mount tables 46 by plastic molding.

As shown in FIG. 33, the condensers 50-4 are inserted into the holders 50-1 of the apertures 50 having integrally molded structures, and the lenses 50-3 are fitted thereto. In this case also, no adhesion process is used. As such, the four apertures 50 and the four diffusion/polarization plate mount tables 46 coupled together as shown in FIG. 32 are fixed to the camera substrate 20, using the legs 50-5 of the apertures 50.

Thus, it becomes possible to simplify the assembly work, and maintain accurate positional relationship between each aperture 50 uniformly. As a result, the distance measurement illustrated in FIG. 27 can be performed with accuracy. In other words, a fitting error of the aperture can be eliminated in the distance calculation.

Other Embodiments

In the aforementioned embodiments, the image capturing object is exemplified by the palm, and the image processing of the image capturing object is exemplified by the vein pattern authentication. However, the present invention is also applicable to other biometric authentication by use of other features of human bodies, including hand skin pattern, blood vessel image of the back of hand, blood vessel image of a finger, and features of face and iris, etc. Also, the present invention is not limited to the application to the biometric authentication, but applicable to other applications. The number of distance-measuring light-emitting devices is not limited to four, but any plurality may be chosen.

While the embodiments of the present invention have been illustrated in the foregoing description, any suitable modifications can be made without departing from the spirit of the invention. All such modifications are not to be excluded from the scope of the invention. The features and advantages of the invention which fall within the scope of the invention are covered by the appended claims.

What is claimed is:

1. An image capturing apparatus for capturing an image of an object by illuminating the object and receiving reflected light from the object, comprising:
    an image sensor for receiving the reflected light;
    a plurality of light-emitting devices mounted in the peripheral positions of the image sensor;
    a light guide member for guiding light of the plurality of light-emitting devices to an image capturing range, and illuminating the image capturing range;
    an optical unit accommodated inside the light guide member and for guiding the reflected light of the object in the illuminated image capturing range to the image sensor;
    a distance-measuring light-emitting device for irradiating the object with light;
    an aperture disposed on the distance-measuring light-emitting device, and for covering the light rays of the distance-measuring light-emitting device, converging the light rays, and guiding to a focusing lens; and
    a control circuit for driving the distance-measuring light-emitting device, detecting spot light position of the distance-measuring light-emitting device from a photographed image of the image sensor, and obtaining the distance to the object,
    wherein the distance-measuring light-emitting devices are mounted for a plurality of numbers on the circuit board so as to measure the distance to the object in the image capturing range, using the image of the image sensor.

2. The image capturing apparatus according to claim 1, wherein the aperture comprises:
    a holder for covering the light rays of the distance-measuring light-emitting device;
    a focusing lens for outputting spotlight; and
    a condenser for converging the light rays of the distance-measuring light-emitting device to the direction of the focusing lens.

3. The image capturing apparatus according to claim 2, wherein the aperture is constituted of a material forming an optical path of an upside-down trapezoidal shape to the direction of the focusing lens.

4. The image capturing apparatus according to claim 1, wherein the plurality of light-emitting devices are mounted on a circuit board at predetermined intervals along a circle in the periphery of the image sensor, and
    wherein the light guide member is ring-shaped corresponding to the circle.

5. The image capturing apparatus according to claim 1, wherein the image sensor and the plurality of light-emitting devices and the distance-measuring light-emitting device are mounted on an identical circuit board.

6. The image capturing apparatus according to claim 1, further comprising:
    a diffusion and polarization plate disposed between the light guide member and the plurality of light-emitting devices, and for diffusing and polarizing the light of the light-emitting devices; and
    a mount table for mounting the diffusion and polarization plate.

7. The image capturing apparatus according to claim 1, further comprising:
    a diffusion and polarization plate disposed between the light guide member and the plurality of light-emitting devices, and for diffusing and polarizing the light of the light-emitting devices; and
    a mount table integrally formed with the aperture, and for mounting the diffusion and polarization plate.

8. The image capturing apparatus according to claim 1, wherein the distance-measuring light-emitting devices are mounted on the circuit board in outer positions of the light-emitting devices.

9. The image capturing apparatus according to claim 1, wherein the plurality of light-emitting devices are constituted of light-emitting devices for emitting infrared light, and
    wherein further comprises an optical filter for filtering visible light.

10. The image capturing apparatus according to claim 1, wherein the light guide member comprises:
    a lower end portion for introducing the light of the light-emitting devices;
    an upper end portion for outputting the light to the image capturing range; and
    a light guide portion for guiding the light of the light-emitting devices from the lower end portion to the upper end portion.

11. The image capturing apparatus according to claim 1, wherein the distance-measuring light-emitting devices are constituted of four light-emitting devices, and mounted on the circuit board in outer positions of the light-emitting devices so as to form a diagonal relationship.

12. The image capturing apparatus according to claim 11, wherein the aperture is constituted of four aperture units corresponding to the four light-emitting devices.

13. The image capturing apparatus according to claim 1, wherein the image sensor images a portion of a living body.

* * * * *